US012210656B2

(12) United States Patent
Takatsuka et al.

(10) Patent No.: US 12,210,656 B2
(45) Date of Patent: Jan. 28, 2025

(54) INFORMATION PROCESSING SYSTEM, INFORMATION PROCESSING METHOD, PROGRAM, AND USER INTERFACE

(71) Applicant: Sony Group Corporation, Tokyo (JP)

(72) Inventors: Susumu Takatsuka, Tokyo (JP); Hiroki Tetsukawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 344 days.

(21) Appl. No.: 17/762,085

(22) PCT Filed: Sep. 16, 2020

(86) PCT No.: PCT/JP2020/035057
§ 371 (c)(1),
(2) Date: Mar. 21, 2022

(87) PCT Pub. No.: WO2021/075198
PCT Pub. Date: Apr. 22, 2021

(65) Prior Publication Data
US 2022/0350928 A1 Nov. 3, 2022

(30) Foreign Application Priority Data
Oct. 17, 2019 (JP) ................ 2019-190350

(51) Int. Cl.
*H04L 29/00* (2006.01)
*G06F 21/64* (2013.01)
(Continued)

(52) U.S. Cl.
CPC ............ *G06F 21/64* (2013.01); *G06V 10/147* (2022.01); *G06V 40/45* (2022.01); *H04L 9/3239* (2013.01); *H04L 9/3247* (2013.01)

(58) Field of Classification Search
CPC ...... G06F 21/64; G06V 10/147; G06V 40/45; H04L 9/3239; H04L 9/3247
(Continued)

(56) References Cited

U.S. PATENT DOCUMENTS 6,922,478 B1    7/2005  Konen
9,158,957 B2 *  10/2015 Boshra ............... H04L 63/0861
(Continued)

FOREIGN PATENT DOCUMENTS

EP    1147493 B1   10/2013
EP    2680191 B1   11/2019
(Continued)

OTHER PUBLICATIONS

International Search Report and Written Opinion mailed on Dec. 22, 2020, received for PCT Application PCT/JP2020/035057, Filed on Sep. 16, 2020, 10 pages including English Translation.

*Primary Examiner* — Brandon Hoffman
*Assistant Examiner* — Michael D Anderson
(74) *Attorney, Agent, or Firm* — XSENSUS LLP

(57) ABSTRACT

An information processing system includes an array sensor with a pixel array having a plurality of one-dimensionally or two-dimensionally arranged pixels including a light-receiving element that receives visible or non-visible light, a hash value generator that generates a hash value from captured-image data based on a photoelectric conversion performed by the pixel array, and an encryption processing section that performs processing of encrypting the hash value; an acquisition section that acquires the captured-image data and the encrypted hash value; a decryption processing section that decrypts the acquired encrypted hash value; a hash value calculator that calculates a hash value from the acquired captured-image data; a hash value comparing section that compares the hash value obtained by the decryption with the
(Continued)

calculated hash value; and a falsification determination section that determines whether the acquired captured-image data has been falsified, based on a comparison result of the hash values.

20 Claims, 28 Drawing Sheets

(51) Int. Cl.
　　*G06V 10/147*　　(2022.01)
　　*G06V 40/40*　　(2022.01)
　　*H04L 9/32*　　(2006.01)
(58) Field of Classification Search
　　USPC .......................................................... 713/176
　　See application file for complete search history.

(56) References Cited

U.S. PATENT DOCUMENTS

| 2011/0267422 | A1 | 11/2011 | Garcia et al. |
| 2019/0104251 | A1 | 4/2019 | Otsuki |
| 2019/0121955 | A1* | 4/2019 | Facon ................... G06F 21/45 |

FOREIGN PATENT DOCUMENTS

| JP | 2015-82195 A | 4/2015 |
| JP | 2017-184198 A | 10/2017 |
| WO | WO-2000049797 A1 | 8/2000 |
| WO | 2019/151368 A1 | 8/2019 |

* cited by examiner

A

User A

B

User A

Still image (Seed frame)        Encryption filter (Encryption key)

INFORMATION PROCESSING SYSTEM, INFORMATION PROCESSING METHOD, PROGRAM, AND USER INTERFACE

CROSS-REFERENCE TO RELATED APPLICATIONS

The present application is based on PCT filing PCT/JP2020/035057, filed Sep. 16, 2020, which claims priority to JP 2019-190350, filed Oct. 17, 2019, the entire contents of each are incorporated herein by reference.

TECHNICAL FIELD

The present technology relates to an information processing system, an information processing method, a program, and a user interface, and in particular, to a technology used to detect whether data has been falsified.

BACKGROUND ART

Technologies have been developed for image processing, and this makes it possible to falsify a captured image of a face or a body of a person to pose as someone else.

Further, if artificial image and voice of a person are created, and a machine is caused to perform an interactive communication, this may result in falsely recognizing the machine as an actual person to perform communication without being aware that the communication partner is the machine.

With respect to such an issue, for example, Patent Literature 1 indicated below discloses detecting a falsification of captured-image data on the basis of digital signature information.

CITATION LIST

Patent Literature

Patent Literature 1: Japanese Patent Application Laid-open No. 2017-184198

DISCLOSURE OF INVENTION

Technical Problem

Here, it is conceivable that a transmission line with an enhanced security could be used as a transmission line through which captured-image data is transmitted, in order to prevent the captured-image data from being falsified. However, the enhancement of security in all of the transmission lines is disadvantageous in costs.

Specifically, a hash value is generated on the basis of output from an image sensor, and, if the output from the image sensor leaks before the hash value is generated, it will be difficult to assure that captured-image data has not been falsified.

Thus, an object of the present technology is to assure, without increasing costs, that captured-image data has not been falsified.

Solution to Problem

An information processing system according to the present technology includes an array sensor that includes a pixel array that includes a plurality of one-dimensionally or two-dimensionally arranged pixels each including a light-receiving element that receives visible light or non-visible light, a hash value generator that generates a hash value from captured-image data obtained on the basis of a photoelectric conversion performed by the pixel array, and an encryption processing section that performs processing of encrypting the hash value; an acquisition section that acquires the captured-image data and the encrypted hash value; a decryption processing section that decrypts the acquired encrypted hash value; a hash value calculator that calculates a hash value from the acquired captured-image data; a hash value comparing section that compares the hash value obtained by the decryption with the calculated hash value; and a falsification determination section that determines whether the acquired captured-image data has been falsified, on the basis of a result of the comparison of the hash values.

In other words, generation of a hash value and encryption processing are performed in the array sensor.

The information processing system may further include a biological analysis processing section that performs analysis for extracting biological information regarding a subject, on the basis of the acquired captured-image data; and a living-body determination section that determines whether the subject is a living body on the basis of a result of the analysis performed by the biological analysis processing section.

This makes it possible to determine whether the subject is a living body.

The information processing system may further include an individual analysis processing section that analyzes an individual feature value of the subject that is included in the acquired captured-image data; and an individual determination section that determines whether the subject is individually recognizable, on the basis of a result of the analysis performed by the individual analysis processing section.

This makes it possible to obtain information used to individually specify the subject.

The information processing system may further include an output controller that performs an output control for notifying a result of the determination performed by the falsification determination section.

This enables a user to recognize the falsification determination result.

Further, in the information processing system, a subject in the captured-image data may be a subject for which biological information is not extractable.

The information processing system may further include an output controller that performs an output control for notifying a result of the determination performed by the living-body determination section.

This enables the user to recognize the living-body determination result.

The information processing system may further include an output controller that performs an output control for notifying a result of the determination performed by the individual determination section.

This enables the user to recognize the individual determination result.

The information processing system may further include an image-capturing apparatus and an information processing apparatus, the image-capturing apparatus may include the array sensor, and the information processing apparatus may include the acquisition section, the decryption processing section, the hash value calculator, the hash value comparing section, the falsification determination section, and the output controller.

For example, such a configuration can be applied to a surveillance camera system that includes the image-capturing apparatus and the information processing apparatus.

In the information processing system, the output controller may perform control such that the acquired captured-image data is output to be displayed, and may perform control such that the result of the determination performed by the falsification determination section with respect to the acquired captured-image data is output to be displayed.

For example, it is conceivable that such an information processing system could be applied to an information processing system that performs a user interface control such that a received captured image is displayed and such that display to indicate whether the image has been falsified is performed.

The output controller in the information processing system may perform control such that the result of the determination performed by the falsification determination section is output to be displayed without the acquired captured-image data being output to be displayed.

For example, it is conceivable that such an information processing system could be applied to a text chat system in which a captured image is not displayed.

The output controller in the information processing system may perform control such that a chat screen is presented, and may perform control such that the result of the determination performed by the falsification determination section is output to be displayed on the chat screen for each participant in a chat, the determination being performed by the falsification determination section with respect to data of a captured image of the participant, the data of the captured image being received from the image-capturing apparatus used by the participant in the chat.

In, for example, a text chat system in which a captured image is not displayed, criteria for determining whether a participant is reliable are displayed for each participant.

The information processing system may further include an image-capturing apparatus and an information processing apparatus, the image-capturing apparatus may include the array sensor and the output controller, and the information processing apparatus may include an authentication processing section that performs authentication processing, the acquisition section, the decryption processing section, the hash value calculator, the hash value comparing section, and the falsification determination section.

For example, it is conceivable that such an information processing system could be applied to an information processing system in which the information processing apparatus (the image-capturing apparatus) transmitting captured-image data notifies, for example, an authentication result.

The output controller in the information processing system may perform control such that the result of the determination performed by the falsification determination section is output to be displayed, the result of the determination being acquired from the information processing apparatus, and the authentication processing section may perform the authentication processing on the basis of the result of the determination performed by the falsification determination section.

In other words, using an apparatus (the image-capturing apparatus) that transmits captured-image data, a user can recognize whether the transmitted captured-image data has reached a server apparatus (the information processing apparatus) without being falsified, the server apparatus being an apparatus on the reception side.

The information processing apparatus in the information processing system may include a biological analysis processing section that performs analysis for extracting biological information regarding a subject, on the basis of the acquired captured-image data, and a living-body determination section that determines whether the subject is a living body on the basis of a result of the analysis performed by the biological analysis processing section; the output controller may perform control such that a result of the determination performed by the living-body determination section is output to be displayed; and the authentication processing section may perform the authentication processing on the basis of the result of the determination performed by the living-body determination section.

In other words, not only falsification determination processing, but also processing that includes extracting biological information from received captured-image data, and determining, on the basis of a result of the extraction, whether a subject is a living body, is performed.

The information processing system may further include an individual analysis processing section that analyzes an individual feature value of the subject that is included in the acquired captured-image data; an individual determination section that determines whether the subject is individually recognizable, on the basis of a result of the analysis performed by the individual analysis processing section; and a state determination section that determines a non-guarantee state, a first guarantee state, a second guarantee state, and a third guarantee state on the basis of a result of the determination of whether the falsification has been performed, a result of the determination of whether the subject is a living body, and a result of the determination of whether the subject is individually recognizable, the non-guarantee state being a state in which there is no guarantee that the acquired captured-image data has not been falsified, the first guarantee state being a state in which the acquired captured-image data is guaranteed to not have been falsified, the second guarantee state being a state in which the acquired captured-image data is guaranteed to not have been falsified, and the subject has been determined to be a living body, the third guarantee state being a state in which the acquired captured-image data is guaranteed to not have been falsified, the subject has been determined to be a living body, and the subject has been determined to be individually recognizable.

This makes it possible to perform processing according to a degree of assurance of security.

The information processing system may further include an output controller that performs output and display according to the non-guarantee state, the first guarantee state, the second guarantee state, or the third guarantee state.

This enables the user to confirm the degree of assurance.

The living-body determination section in the information processing system may determine whether the subject is a living body by determining whether there is a change in a biological signal of the subject that is obtained as a result of the analysis.

For example, the change in the biological signal is extracted by analyzing pieces of data of a plurality of captured images.

An information processing method according to the present technology includes acquiring, by an information processing apparatus, captured-image data obtained by a photoelectric conversion being performed and an encrypted hash value from an array sensor that includes a pixel array that includes a plurality of one-dimensionally or two-dimensionally arranged pixels each including a light-receiving element that receives visible light or non-visible light, a hash value generator that generates a hash value from the captured-image data, and an encryption processing section that performs processing of encrypting the hash value; decrypting, by the information processing apparatus, the acquired encrypted hash value; calculating, by the information processing apparatus, a hash value from the acquired captured-image data; comparing, by the information processing apparatus, the hash value obtained by the decryption with the calculated hash value; and determining, by the information processing apparatus, whether the acquired captured-image data has been falsified, on the basis of a result of the comparison of the hash values.

A program according to the present technology causes an information processing apparatus to perform a process including: acquiring captured-image data obtained by a photoelectric conversion being performed and an encrypted hash value from an array sensor that includes a pixel array that includes a plurality of one-dimensionally or two-dimensionally arranged pixels each including a light-receiving element that receives visible light or non-visible light, a hash value generator that generates a hash value from the captured-image data, and an encryption processing section that performs processing of encrypting the hash value; decrypting the acquired encrypted hash value; calculating a hash value from the acquired captured-image data; comparing the hash value obtained by the decryption with the calculated hash value; and determining whether the acquired captured-image data has been falsified, on the basis of a result of the comparison of the hash values.

Accordingly, generation of a hash value and encryption processing are performed in the array sensor.

A user interface according to the present technology notifies a result of performing processing of determining whether captured-image data obtained by a photoelectric conversion being performed has been falsified, on the basis of a result of comparing a hash value obtained by decrypting an encrypted hash value with a hash value calculated from the captured-image data, the encrypted hash value and the captured-image data being acquired from an array sensor that includes a pixel array that includes a plurality of one-dimensionally or two-dimensionally arranged pixels each including a light-receiving element that receives visible light or non-visible light, a hash value generator that generates a hash value from the captured-image data, and an encryption processing section that performs processing of encrypting the hash value.

MODE(S) FOR CARRYING OUT THE INVENTION

Embodiments will now be described below in the following order.

<1. First Embodiment>
<1-1. System Configuration>
<1-2. Configuration of User Terminal>
<1-3. Overall Flow>
<1-4. Processing Performed on Transmission Side>
<1-5. Processing Performed on Reception Side>

<2. Second Embodiment>
<2-1. System Configuration>
<2-2. Regarding Encryption-Target Signal>
<2-3. Processing Performed on Transmission Side>
<2-4. Processing Performed on Reception Side>
<3. Third Embodiment>
<3-1. Processing Performed on Transmission Side>
<3-2. Processing Performed on Reception Side>
<3-3. Application Example>
<4. Fourth Embodiment>
<4-1. System Configuration>
<4-2. Login Screen>
<4-3. Processing Performed by User Terminal>
<4-4. Processing Performed by Server Apparatus>
<5. Modifications>
<6. Conclusion>
<7. Present Technology>

1. FIRST EMBODIMENT

1-1. System Configuration

Figure 1:
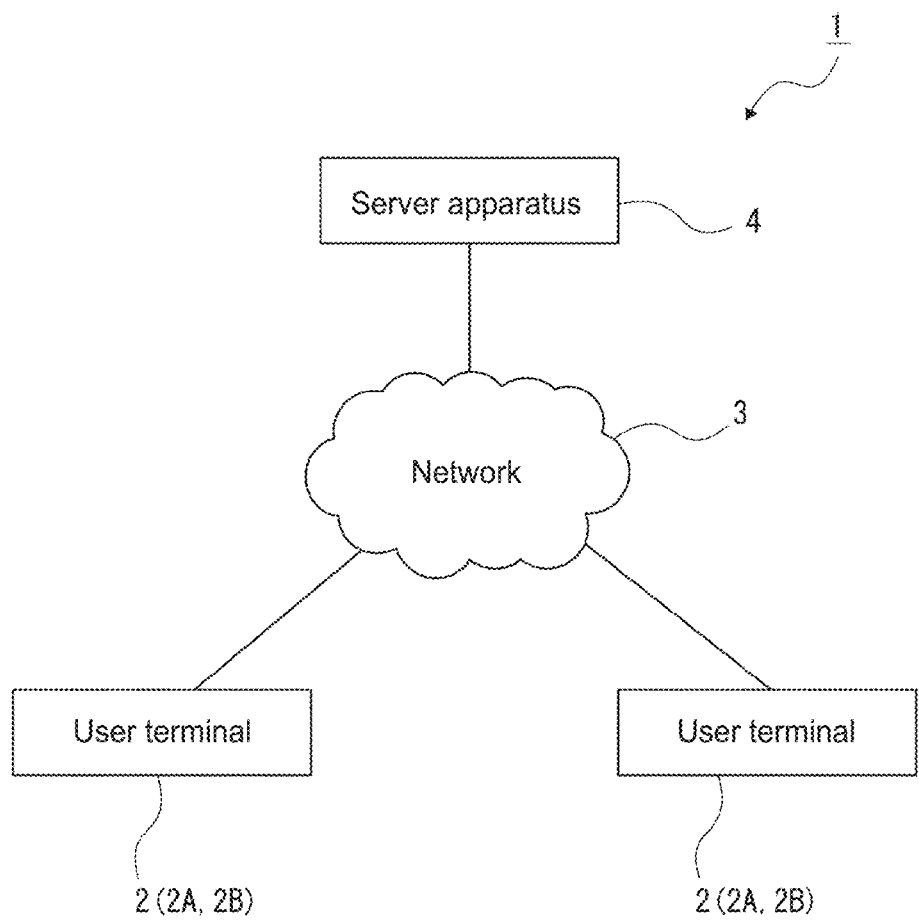
FIG. 1 schematically illustrates an example of a configuration of an information processing system according to a first embodiment.

FIG. 1 is a block diagram schematically illustrating an example of a configuration of an information processing system 1 according to a first embodiment.

Note that the first embodiment illustrates the information processing system 1 serving as a video chat system.

The information processing system 1 includes a user terminal 2 that is used by a user to use a video chat system, a network 3, and a server apparatus 4.

The user terminal 2 is an image-capturing apparatus and an information processing apparatus according to the present technology. Specifically, the user terminal 2 is an example of an image-capturing apparatus that performs image-capturing using an image sensor to obtain image data (captured-image data) that is digital data. Further, the user terminal 2 is an example of an information processing apparatus that performs processing to prove that captured-image data that is acquired from another user terminal 2 through the network 3 has not been falsified.

In the following description, the user terminal 2 performing image-capturing using an image sensor and transmitting captured-image data is referred to as a user terminal 2A. Further, the user terminal 2 receiving the captured-image data from the user terminal 2A is referred to as a user terminal 2B.

Note that, in the information processing system 1 serving as a video chat system, transmission and reception of captured-image data are performed in both directions. Thus, a single user terminal 2 can be regarded as the user terminal 2A or the user terminal 2B.

In the present embodiment, target data for a digital signature is data of an image captured using the user terminal 2A.

When the user terminal 2A transmits captured-image data to the user terminal 2B, the user terminal 2A generates a private key used for a digital signature, and a public key based on the private key, calculates a hash value for the transmission-target captured-image data, and encrypts the hash value using the private key. Then, the user terminal 2A transmits, to the user terminal 2B, the encrypted hash value, the transmission-target captured-image data, and the public key.

On the basis of these pieces of data transmitted from the user terminal 2A, the user terminal 2B performs processing of determining whether the received captured-image data has been falsified (falsification determination processing).

Note that the falsification determination processing will be described later.

Examples of the network 3 include the Internet, a home network, a local area network (LAN), a satellite communication network, and any other networks.

The server apparatus 4 is an information processing apparatus that manages a video chat system, and includes, for example, a function of managing personal information regarding a user who uses the video chat system, and a function of storing a record and a history of a call between users.

1-2. Configuration of User Terminal

Figure 2:
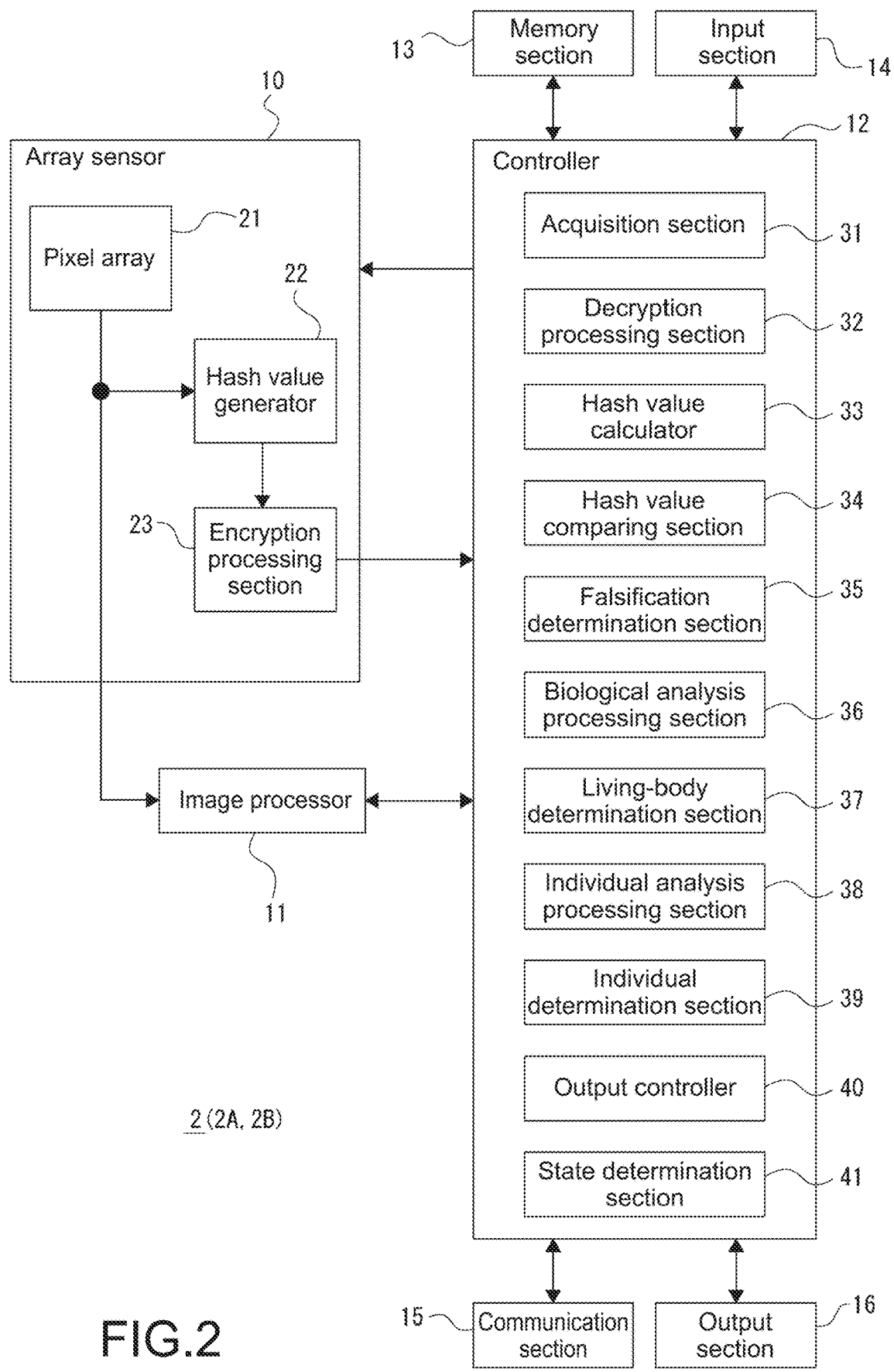
FIG. 2 is a block diagram illustrating an example of a configuration of the inside of a user terminal according to the first embodiment.

FIG. 2 is a block diagram illustrating an example of a configuration of the inside of the user terminal 2.

In order to serve as the user terminal 2A, the user terminal 2 includes an array sensor 10, an image processor 11, a controller 12, a memory section 13, an input section 14, a communication section 15, and a output section 16.

The array sensor 10 includes a pixel array 21, a hash value generator 22, and an encryption processing section 23.

The pixel array 21 includes a plurality of one-dimensionally or two-dimensionally arranged pixels each including a light-receiving element that receives visible light or non-visible light. For each pixel, the pixel array 21 receives light that enters through a camera optical system (not illustrated) included in the user terminal 2, and performs a photoelectric conversion to obtain captured-image data.

The hash value generator 22 generates (calculates) a hash value using the captured-image data output by the pixel array 21. The generated hash value is output to the encryption processing section 23 on the output side.

The encryption processing section 23 performs processing of encrypting the input hash value. A private key is used to perform the encryption processing. In other words, the encryption processing section 23 generates a private key that is a key used to generate a signature, and a public key that is a key used to verify a signature.

The array sensor 10 outputs the encrypted hash value and the generated public key to the controller 12. Further, the array sensor 10 outputs the captured-image data generated by the pixel array 21 to the image processor 11.

The array sensor 10 includes hardware components that are an image sensor device, a memory device such as a dynamic random access memory (DRAM), and a processor, although an illustration thereof is omitted. Further, the array sensor 10 is a device with the integrated components that is obtained by those components being laid flat or being arranged in a layered formation.

The array sensor 10 of this example includes a function of generating a hash value and a function of performing encryption, and is a device that can be called a so-called intelligent array sensor.

The image processor 11 performs processing of digitizing a photoelectric-conversion signal. Further, the image processor 11 performs processing of temporarily storing the digitized signal in a buffer, and reads the signal stored in the buffer to perform various kinds of necessary signal processing (image processing).

For example, processing performed to adjust the image quality, such as color correction, gamma correction, color shading processing, gain processing, and edge enhancement processing, is conceivable as the various kinds of signal processing. Further, it is conceivable that the image processor 11 performs processing of changing the data size, such as data compression processing, a resolution conversion, and a frame rate conversion.

With respect to the respective processes performed by the image processor 11, a parameter used to perform each of the processes is set. Examples of the parameter include set values such as a coefficient used to correct for the color or the brightness, a gain value, a compression rate, and a frame rate. The image processor 11 performs a necessary process using a parameter set for the process.

The controller 12 includes, for example, a microcomputer that includes a central processing unit (CPU), a read only memory (ROM), and a random access memory (RAM), and performs an overall control on the user terminal 2 by the CPU performing various kinds of processing in accordance with a program stored in the ROM or a program loaded into the random access memory (RAM).

For example, the controller 12 gives an instruction to the array sensor 10 to control executions of various kinds of processing such as processing of acquiring captured-image data. Further, with respect to the image processor 11, the controller 12 controls executions of various kinds of processing.

Further, the controller 12 controls writing of various pieces of data into the memory section 13 and reading of various pieces of data from the memory section 13. The memory section 13 is, for example, a nonvolatile storage device such as a hard disk drive (HDD) or a flash memory device, and is used as a storing destination (a recording destination) for various pieces of data such as captured-image data obtained by the array sensor 10.

Furthermore, the controller 12 acquires an input signal from the input section 14, and performs control depending on the input signal. Examples of the input section 14 include a keyboard, a mouse, and a touch panel that are used by a user who uses a video chat. Further, the examples of the input section 14 also include a velocity sensor, an acceleration sensor, and an angular velocity sensor that are included in, for example, a smartphone or a camera.

The controller 12 acquires information regarding operations thereof and sensor information, and performs various kinds of processing.

Further, the controller 12 communicates various pieces of data to an external apparatus through the communication section 15. The communication section 15 can communicate data to an external apparatus through the network 3 illustrated in FIG. 1.

In response to a request being made by the user terminal 2B illustrated in FIG. 1, which is another user terminal, the controller 12 can transmit, to the user terminal 2B and through the communication section 15, various pieces of data such as captured-image data obtained by the array sensor 10 and stored in the memory section 13.

Further, the controller 12 outputs an output signal to the output section 16. Examples of the output section 16 include a display that includes, for example, a liquid crystal display (LCD) or an organic electroluminescence (EL) panel; and a speaker.

The controller 12 includes various functions related to a digital signature. Specifically, the controller 12 includes an acquisition section 31, a decryption processing section 32, a hash value calculator 33, a hash value comparing section 34, a falsification determination section 35, a biological analysis processing section 36, a living-body determination section 37, an individual analysis processing section 38, an individual determination section 39, an output controller 40, and a state determination section 41.

These components implement functions for the user terminal 2B. In other words, they are components for implementing functions used to determine whether captured-image data received from the user terminal 2A has been falsified.

Note that, in the present embodiment and other embodiments described below, the user terminal 2 does not have to include all of the functions, and may only include a portion of the components described above.

The acquisition section 31 performs processing of acquiring captured-image data and an encrypted hash value that are generated by the user terminal 2A. Further, the acquisition section 31 acquires a public key used to decrypt the encrypted hash value.

The decryption processing section 32 performs processing of decrypting the encrypted hash value. The public key is used for decryption.

The hash value calculator 33 performs processing of calculating a hash value from the received captured-image data.

The hash value comparing section 34 performs processing of comparing the hash value obtained by the decryption performed by the decryption processing section 32 with the hash value calculated by the hash value calculator 33.

The falsification determination section 35 performs falsification determination processing of determining whether captured-image data has been falsified, on the basis of a result of comparing of the hash values. A determination result (a determination that no falsification has been performed) showing that it is assured that data has not been falsified, and a determination result (a determination that falsification has been performed) showing that there is no assurance that data has not been falsified are set to be falsification results for a falsification determination. In other words, the determination that no falsification has been performed is not necessarily performed because data has not been falsified. When there is no assurance that data has not been falsified, the determination that falsification has been performed is performed even when data has not actually been falsified.

The biological analysis processing section 36 performs processing of analyzing received captured-image data and extracting biological information. For example, the biological analysis processing section 36 extracts biological information by performing a comparative analysis with respect to received pieces of data of a plurality of captured images.

The living-body determination section 37 performs processing of determining whether a subject is a living body, on the basis of a result of the analysis performed by the biological analysis processing section 36. For example, it is determined whether captured-image data is obtained by capturing an image of an actual living person, that is, whether a living person is a subject. Further, it may be determined how many people corresponding to subjects appear in a captured image.

The individual analysis processing section 38 performs processing of analyzing received captured-image data and extracting an individual feature value of a subject. The individual feature value is information with which an individual can be specified, and examples of the individual feature value include a skin color; a location of an eye; a ratio of a length between eyebrows to a width of a face; a location and a shape of a nose; a location, a shape, a shape, and a color of lips; and a location of a mole and the number of moles. Further, a hairstyle and a color of hair may be extracted as an individual feature value, although they are not universal. Furthermore, when the whole body of a subject appears in an image, a ratio of a body part to another body part, a length of a body part, a size of a body part, and the like, such as a shoulder width and lengths of limbs, may be extracted.

Note that a feature value used to specify an individual of a living body other than a human, such as a dog and a cat, may be extracted as the individual feature value.

The individual determination section 39 performs processing of determining an individual on the basis of a result of the analysis performed by the individual analysis processing section 38. In the processing, for example, an individual may be specified by the analysis result being transmitted to another information processing apparatus, or an individual may be specified by the user terminal 2B. The following is an example of making a request that another information processing apparatus specify an individual: an individual feature value for each user is stored in the server apparatus 4, and an extracted individual feature value is transmitted to the server apparatus 4 to make a request to specify an individual. In this case, the server apparatus 4 performs processing of comparing the stored individual feature value with the received extracted individual feature value to specify an individual.

The output controller 40 performs an output control to provide a notification to a user according to a result of the determination performed by the falsification determination section 35, a result of the determination performed by the living-body determination section 37, and a result of the determination performed by the individual determination section 39. For example, the output controller 40 performs a user interface control to control display performed on a display section. Further, an output control on, for example, sound may be performed.

According to results of various determination processes performed on captured-image data received from the user terminal 2A, the state determination section 41 performs processing of determining a state (an assurance state) of the captured-image data. For example, a non-guarantee state ST0, a first guarantee state ST1, a second guarantee state ST2, and a third guarantee state ST3 are set to be states of captured-image data, where the non-guarantee state ST0 is a state in which there is no guarantee that captured-image data has not been falsified, the first guarantee state ST1 is a state in which it is only guaranteed that captured-image data has not been falsified, the second guarantee state ST2 is a state in which captured-image data is guaranteed to not have been falsified, and a subject has been determined to be a living body, and the third guarantee state ST3 is a state in which captured-image data is guaranteed to not have been falsified, a subject has been determined to be a living body, and the subject has been individually recognized.

Note that the example in which the array sensor 10 and the controller 12 are separate from each other has been described with reference to FIG. 2. However, the controller 12 may be provided as a portion of the array sensor 10. The same applies to the other embodiments described later.

1-3. Overall Flow

Figure 3:
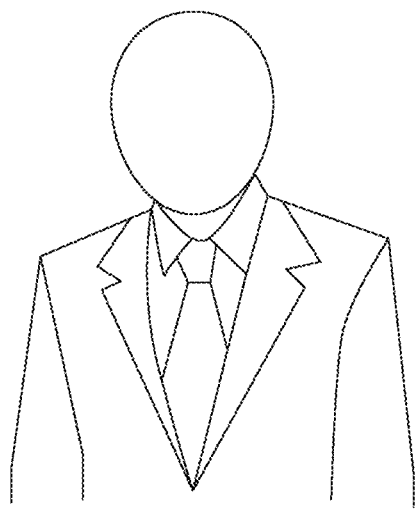
FIG. 3 is a schematic explanatory diagram used to describe a flow when a video chat system according to the first embodiment is used.
Figure 3:
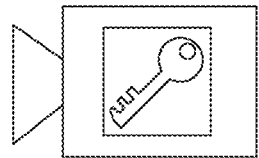
Figure 3:
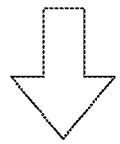
Figure 3:
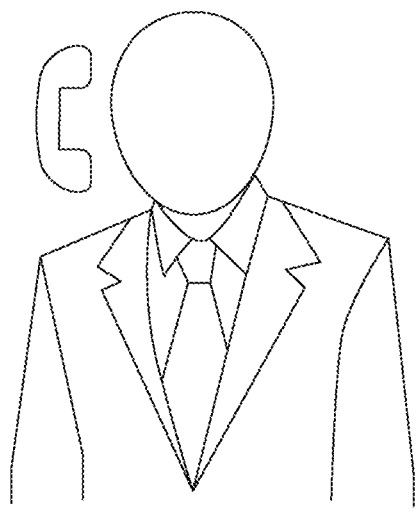
Figure 4:
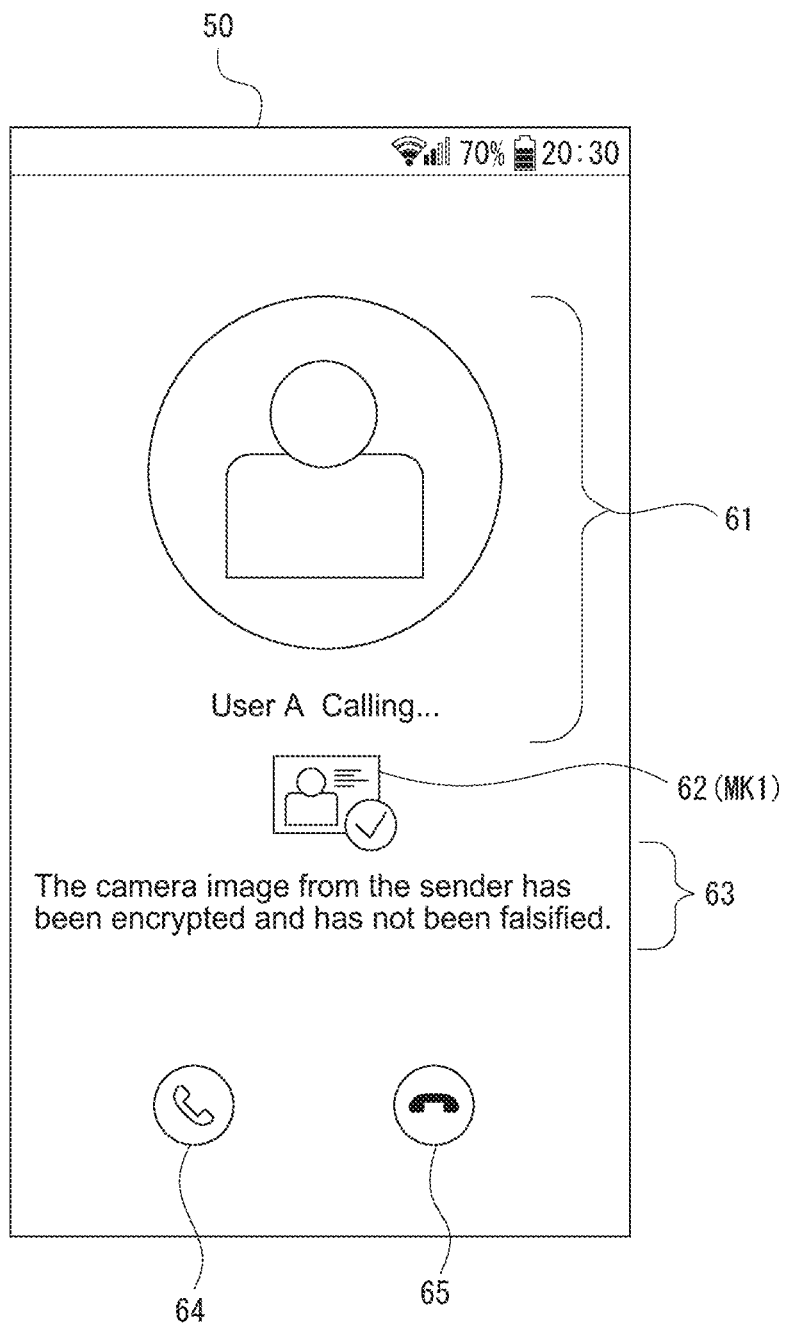
FIG. 4 illustrates an example of an incoming call screen in the video chat system according to the first embodiment.
Figure 5:
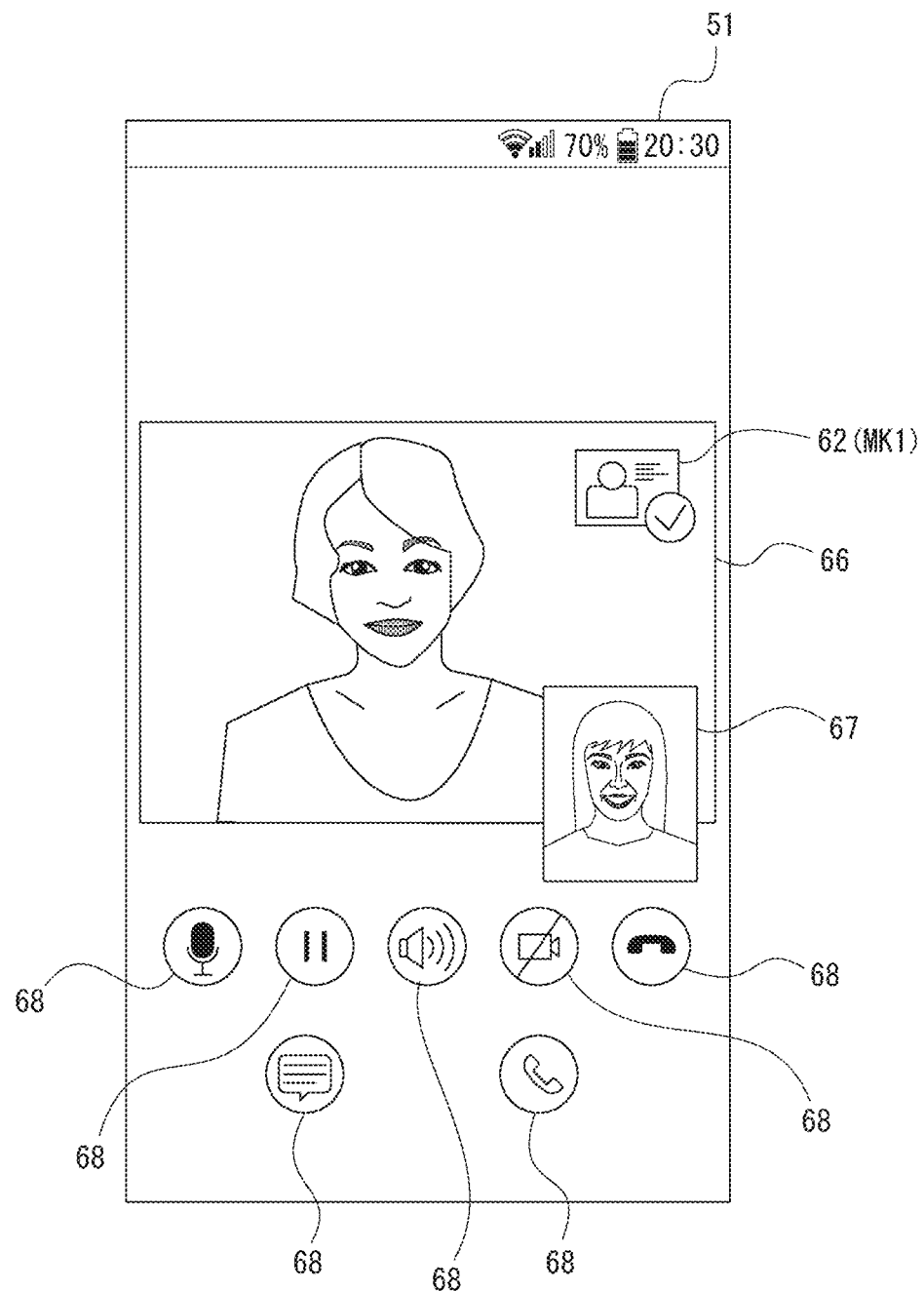
FIG. 5 illustrates an example of a call screen in the video chat system according to the first embodiment.

FIGS. 3, 4, and 5 illustrate an example of an overall flow when a user A who uses the user terminal 2A makes a call request to another user B who uses the user terminal 2B, using a video chat.

First, when the user A starts a program used to use the video chat system (hereinafter referred to as a "video chat program"), the user terminal 2A starts a camera function of the user terminal 2A in accordance with a program of an application, and performs an image-capturing operation (refer to A of FIG. 3). Here, the user terminal 2A generates a hash value from captured-image data obtained by a photoelectric conversion being performed, and performs processing of encrypting the hash value.

Subsequently, when the user A operates the video chat program to select a partner at the other end of the line and to start calling, an incoming call screen 50 that indicates that there is an incoming call from the user A is displayed on a display section of the user terminal 2B. An example of the incoming call screen 50 illustrated in FIG. 4 is an example in which the user terminal 2B is a mobile terminal such as a smartphone.

As illustrated in FIG. 4, a caller display field 61 in which an icon image regarding a caller and a registered name of the user A corresponding to the caller are displayed, an assurance icon 62 that indicates that captured-image data received from the user terminal 2A has not been falsified, an explanatory text 63 that explains, in the form of a text, that captured-image data has not been falsified, a call start button 64, and a call rejection button 65 are arranged on the incoming call screen 50.

An icon image registered by the user A corresponding to the caller, or an image based on data of a captured image that is captured using the user terminal 2A when a current call request is made, may be displayed in the caller display field 61.

For example, an icon image depending on one of the above-described states (ST0 to ST3) of captured-image data may be displayed as the assurance icon 62. FIG. 4 illustrates an example of a state in which a first assurance icon MK1 is displayed correspondingly to the first guarantee state ST1 in which captured-image data just received from the user terminal 2A is guaranteed to not have been falsified.

The state in which the first assurance icon MK1 is displayed as the assurance icon 62 may be a state in which it is only assured that captured-image data has not been falsified, since the user terminal 2B has performed falsification determination processing and has not performed determination processing other than the falsification determination processing (living-body determination processing and individual determination processing), or the state in which the first assurance icon MK1 is displayed as the assurance icon 62 may be a state in which it is only assured that the captured-image data has not been falsified, since the user terminal 2B has performed the living-body determination processing and the individual determination processing in addition to the falsification determination processing, but a subject has not been determined to be a living body, or the subject has not been individually recognized.

By visually confirming the assurance icon 62, the user B can confirm that captured-image data received from a caller before starting a call has not been falsified, that is, the user B can confirm that an image actually captured using the user terminal 2A has been transmitted, and a call request is not being made by someone who is posing as the caller using fraudulently acquired image data.

Accordingly, the user B can recognize a fraudulent call request such as fraud, and this makes it possible to prevent damage from being caused.

When the user B operates the call start button 64, a call screen 51 is displayed on the display section of the user terminal 2B. FIG. 5 illustrates an example of the call screen 51.

A partner's image display field 66, a user's own image display field 67, and various functional icons 68 are displayed on the call screen 51.

Data of a moving image that is being captured using the user terminal 2A used by a partner at the other end of the line is displayed in the partner's image display field 66.

Data of a moving image of a user (that is, the user B) that is displayed on the user terminal 2A of the partner at the other end of the line is reduced to be displayed in the user's own image display field 67.

The assurance icon 62 is superimposed to be displayed on the partner's image display field 66. In the example illustrated in FIG. 5, the first assurance icon MK1 indicating a state in which it is only assured that captured-image data has not been falsified is superimposed to be displayed as the assurance icon 62.

The functional icons 68 are provided on the screen as operators used to perform various functions. Examples of the various functions include a function of terminating a call, a function of turning off sound on the user's side, a function of pausing a call, a function of changing volume, a function of stopping transmission of a user's own moving image, and a function of chatting in the form of a text. These functions are merely examples, and the functional icon 68 used to perform another function may be displayed on the call screen 51. Further, a portion of the functional icons 68 described above do not necessarily have to be displayed. Furthermore, whether these icons are to be displayed or are not to be displayed may be settable by a user.

When the assurance icon 62 is continuously displayed on the call screen 51, this enables the user B to confirm that moving-image data transmitted from the partner at the other end of the line (the user A) corresponds to an image actually captured using the user terminal 2A, and thus to recognize when, for example, a call is taken over by an unauthorized person during the call.

Note that, for this purpose, it is desirable that a process of generating a hash value for captured-image data, a process of encrypting the hash value, and a process of transmitting the encrypted hash value be performed in the user terminal 2A at regular time intervals such as every several seconds, and, in response to the processes being performed, a process of decrypting the received hash value, a comparison process, and a falsification determination process be performed in the user terminal 2B.

The example in which the first assurance icon MK1 is displayed as the assurance icon 62 has been described with reference to FIGS. 4 and 5. However, another icon image may be displayed depending on an assurance state of received captured-image data.

Figure 6:
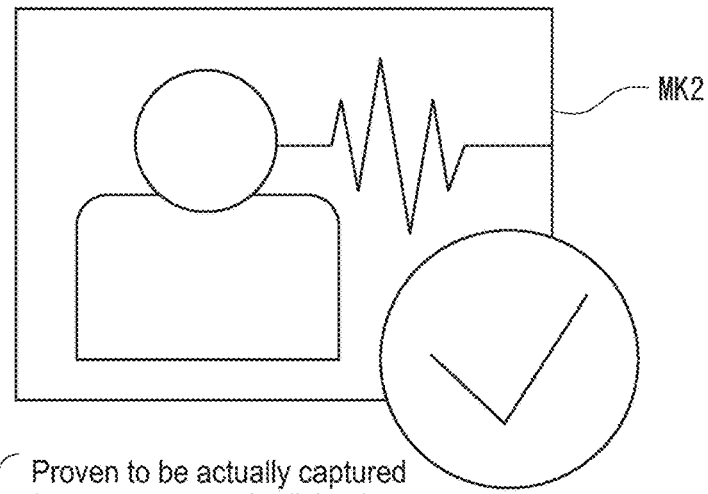
FIG. 6 illustrates an example of a second assurance icon according to embodiments.

For example, in the second guarantee state ST2 corresponding to a state in which captured-image data is guaranteed to not have been falsified, and a subject has been determined to be a living body, a second assurance icon MK2 illustrated in FIG. 6 may be displayed on the respective screens as the assurance icon 62. Further, instead of the explanatory text 63 on the incoming call screen 50 of FIG. 5, the explanatory text 63 illustrated in FIG. 6 is displayed.

Figure 7:
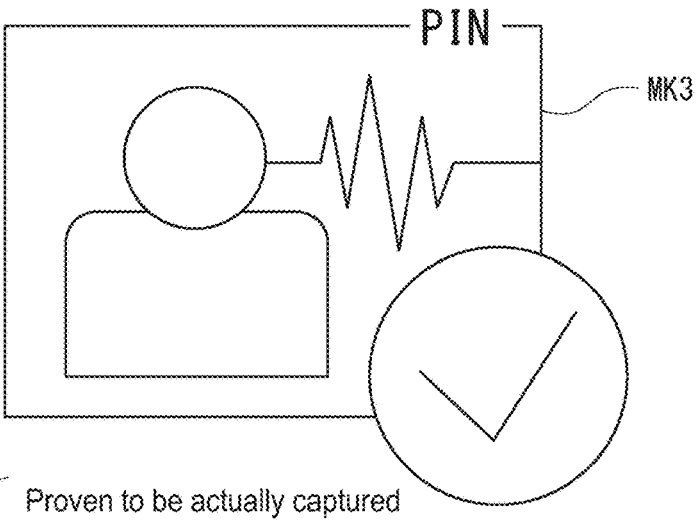
FIG. 7 illustrates an example of a third assurance icon according to the embodiments.

Further, in the third guarantee state ST3 corresponding to a state in which captured-image data is guaranteed to not have been falsified, a subject has been determined to be a living body, and the subject has been individually recognized, a third assurance icon MK3 illustrated in FIG. 7 may be displayed on the respective screens as the assurance icon 62. Further, instead of the explanatory text 63 on the incoming call screen 50 of FIG. 5, the explanatory text 63 illustrated in FIG. 7 is displayed.

Figure 8:
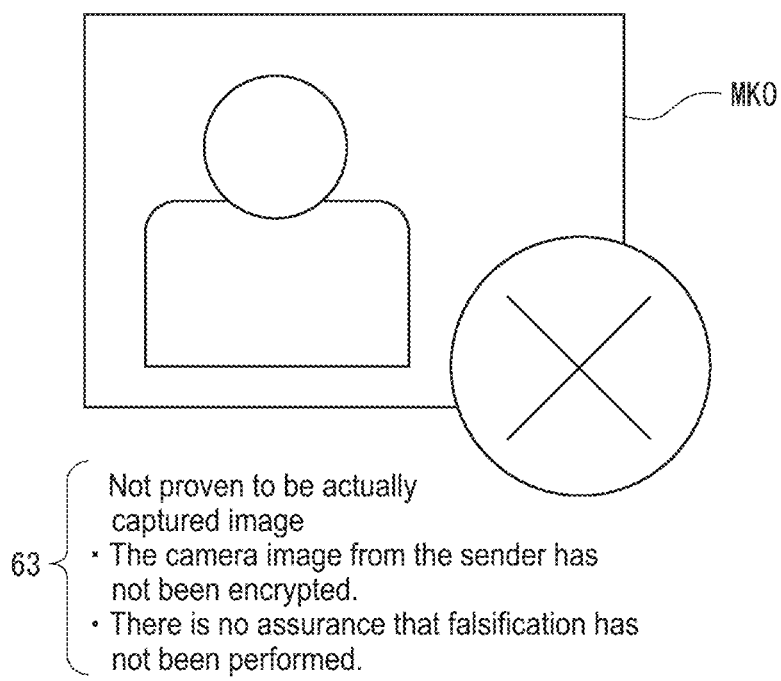
FIG. 8 illustrates an example of a non-assurance icon according to the embodiments.

Furthermore, in the non-guarantee state ST0 corresponding to a state in which there is no guarantee that captured-image data has not been falsified, a non-assurance icon MK0 illustrated in FIG. 8 may be displayed on the respective screens as the assurance icon 62. Instead of the explanatory text 63 on the incoming call screen 50 of FIG. 5, the explanatory text 63 illustrated in FIG. 8 is displayed.

Note that the respective icon images are merely examples. Each of the icon images may be configured such that an assurance state of received captured-image data can be identified.

1-4. Processing Performed on Transmission Side

Figure 9:
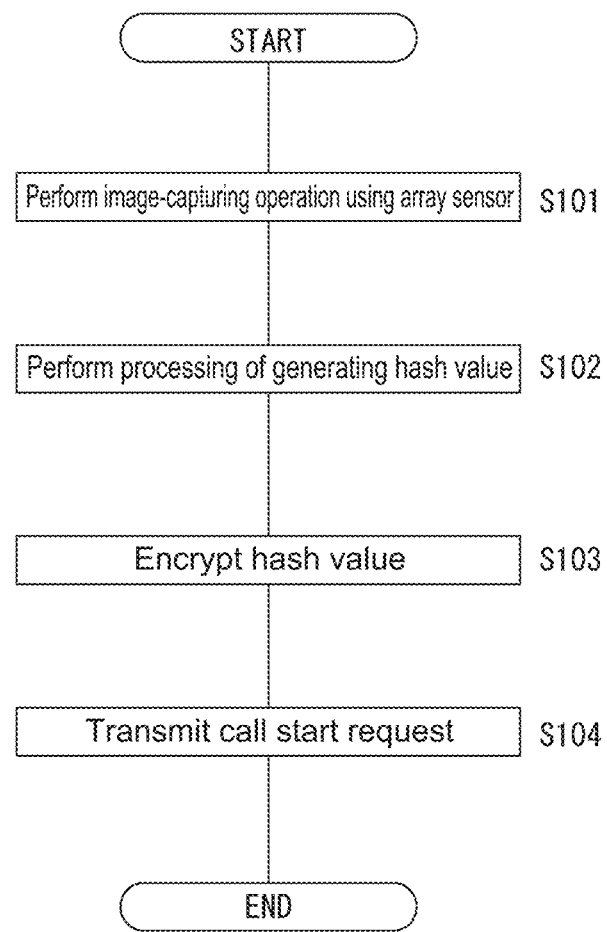
FIG. 9 is a flowchart illustrating processing performed by the user terminal on a transmission side in the video chat system according to the first embodiment.

FIG. 9 illustrates an example of processing performed by the user terminal 2A on a transmission side in order to implement the video chat system described above. Note that the series of processes illustrated in FIG. 9 is, for example, processing performed when the user A operates the user terminal 2A to start the video chat program.

First, in Step S101, the controller 12 of the user terminal 2A starts a camera function and performs an image-capturing operation using the array sensor.

Next, in Step S102, the controller 12 of the user terminal 2A performs processing of generating a hash value from captured-image data obtained by performing the image-capturing operation.

Subsequently, in Step S103, the controller 12 of the user terminal 2A performs processing of encrypting the generated hash value using a private key.

When the user A selects a partner at the other end of the line, and performs an operation in order to transmit a call start request, the controller 12 of the user terminal 2A performs processing of transmitting the call start request in Step S104. For example, the call start request is transmitted to the user terminal 2B used by the user B through the server apparatus 4.

Note that, in the processing of transmitting the call start request in Step S104, the captured-image data acquired in Step S101, the hash value encrypted in Step S103, and a generated public key are transmitted to the user terminal 2B.

1-5. Processing Performed on Reception Side

Figure 10:
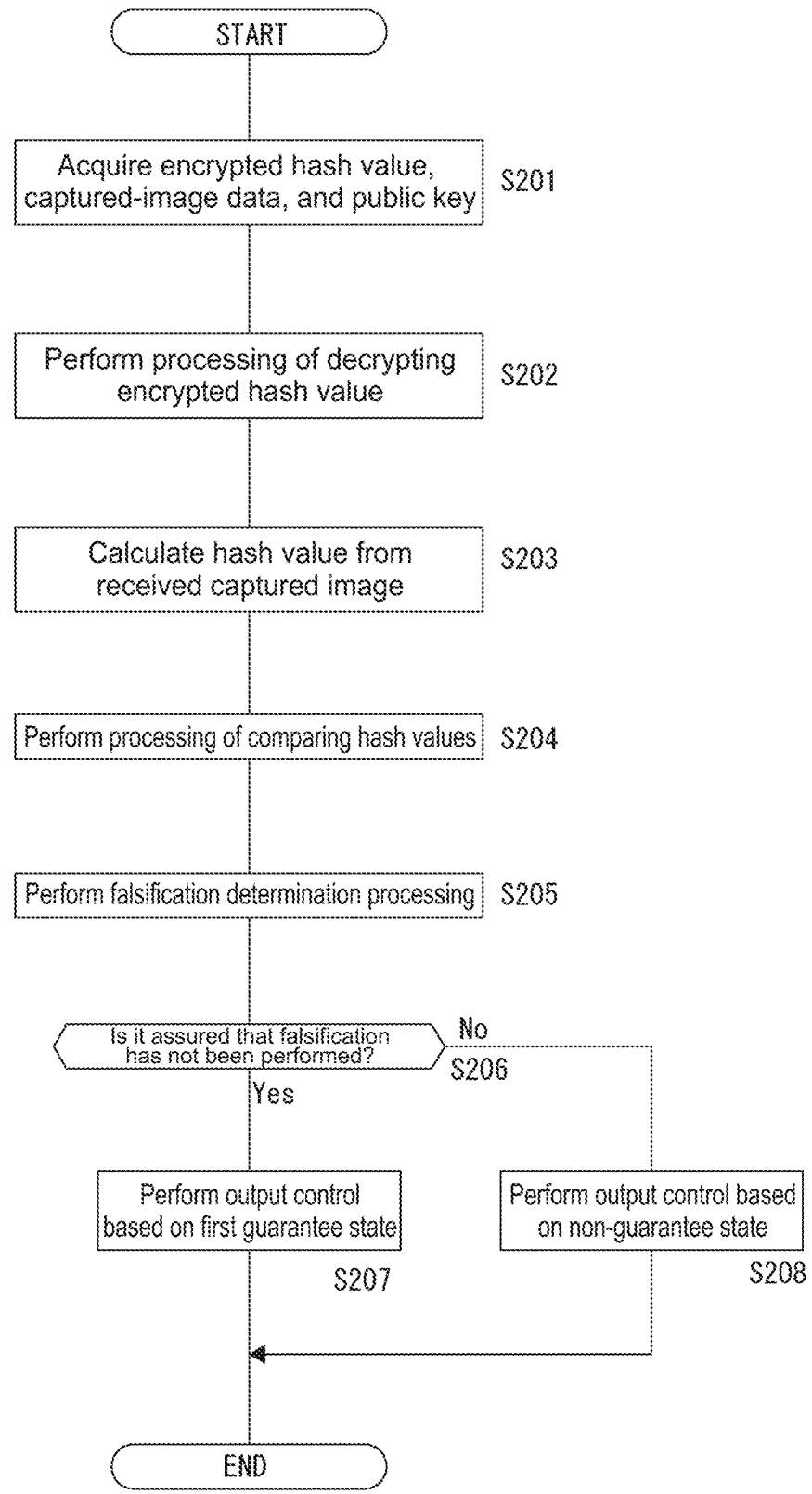
FIG. 10 is a flowchart illustrating processing performed by the user terminal on a reception side in the video chat system according to the first embodiment.

FIG. 10 illustrates an example of processing performed by the user terminal 2B on a reception side in order to implement the video chat system described above.

When the user terminal 2B receives the captured-image data, the encrypted hash value, and the public key, and the video chat program is started, the controller 12 of the user terminal 2B performs processing of acquiring the received pieces of data in Step S201.

Subsequently, in Step S202, the controller 12 of the user terminal 2B performs processing of decrypting the encrypted hash value.

Further, in Step S203, the controller 12 of the user terminal 2B performs processing of calculating a hash value from the received captured image.

In Step S204, the controller 12 of the user terminal 2B performs processing of comparing the calculated hash value with the hash value obtained by the decryption.

In Step S205, the controller 12 of the user terminal 2B performs falsification determination processing. This processing is processing of determining whether falsification has been performed, according to a result of comparing the hash values. Note that, when falsification could have been performed, it is determined that there is no assurance that the falsification has not been performed, regardless of whether the falsification has actually been performed.

Specifically, when the two hash values match, a determination that no falsification has been performed is obtained as a determination result. On the other hand, when the two hash values do not match, a determination that falsification has been performed is obtained as the determination result.

In Step S206, the controller 12 of the user terminal 2B performs branch processing depending on the determination result obtained by performing the falsification determination processing.

When it is assured that falsification has not been performed (the determination that no falsification has been performed), the controller 12 of the user terminal 2B performs an output control based on the first guarantee state ST1 in Step S207.

The output control based on the first guarantee state ST1 is, for example, processing of displaying the first assurance icon MK1 and the explanatory text 63 on the incoming call screen 50 of FIG. 4.

Another example of the output control may be processing of performing a sound output depending on the first guarantee state ST1.

On the other hand, when there is no assurance that falsification has not been performed (the determination that falsification has been performed), that is, in the non-guarantee state ST0, the controller 12 of the user terminal 2B performs an output control based on the non-guarantee state ST0 in Step S208. The output control based on the non-guarantee state ST0 is, for example, processing of displaying the non-assurance icon MK0 and the explanatory text 63 (refer to FIG. 8) on the incoming call screen 50 of FIG. 4. Further, for example, sound may be output in this processing.

When it is desired to be assured, at regular time intervals, that falsification has not been performed, as described above, the user terminal 2A performs the processing of FIG. 9 at regular time intervals, and the user terminal 2B performs the processing of FIG. 10 at regular time intervals. This enables the user B to recognize when, for example, a call is taken over by an unauthorized person during the call.

2. SECOND EMBODIMENT

In a second embodiment, captured-image data that is transmitted from the user terminal 2A to the user terminal 2B is encrypted in order to enhance the confidentiality of a call.

In the following description, a portion similar to the portion of the first embodiment is denoted by a reference numeral similar to a reference numeral of the portion of the first embodiment, and a description thereof is omitted as appropriate.

2-1. System Configuration

In the user terminal 2 (2A, 2B) of the information processing system 1 according to the second embodiment, the array sensor 10 includes an image encryption processing section 24.

Thus, a configuration of the image encryption processing section 24 is primarily described here.

The image encryption processing section 24 performs processing of encrypting captured-image data that is output from the pixel array 21. There are various examples of the encryption processing, and an example of performing encryption processing using photoelectric random numbers is described here.

The photoelectric random numbers used when the image encryption processing section 24 encrypts captured-image data that is target data for a digital signature refer to random numbers obtained on the basis of a photoelectric conversion performed by the array sensor 10.

Specifically, in this example, values of electric signals for respective pixels that are obtained by a photoelectric conversion performed by the array sensor 10 are acquired as photoelectric random numbers, and an encryption key is generated.

Figure 12:
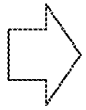
FIG. 12 illustrates an example of a method for generating an encryption filter (an encryption key) on the basis of photoelectric random numbers.

FIG. 12 illustrates an example of a method for generating an encryption filter (an encryption key) with respect to image data on the basis of photoelectric random numbers.

First, the figure illustrates, on the left, values of electric signals for respective pixels that are obtained by a photoelectric conversion performed by the array sensor 10. In this example, values of respective pixels (brightness values) of an image (a still image) obtained by image-capturing performed by the array sensor 10 are used as the photoelectric random numbers.

In the following description, a frame image captured to obtain photoelectric random numbers, that is, a frame image from which photoelectric random numbers are generated is referred to as a "seed frame".

In this example, the above-described values of electrical signals for respective pixels are not used as photoelectric random numbers with no change, but, as illustrated on the right in the figure, at least a portion of the values of the electrical signals for the respective pixels are assigned to pixel positions that are different from pixel positions at which the assigned values are actually obtained, and photoelectric random numbers are generated. In other words, pixels positions for the values of the electrical signals for the respective pixels are shuffled to generate photoelectric random numbers. Further, in this example, the photoelectric random numbers generated as described above are used as an encryption key (an encryption filter) with respect to captured-image data.

When pixel positions are shuffled to generate photoelectric random numbers, as described above, this makes it more difficult to decrypt an encryption key, and thus makes it possible to enhance the security, compared to when photoelectric random numbers obtained by assigning values of electric signals for respective pixels to pixel positions at which the values of the electric signals are actually obtained, are used with no change.

Here, values of electric signals for respective pixels may be modulated using a specified algorithm to be used to generate an encryption key. For example, a value obtained by multiplying a value of an electric signal for each pixel by a specified coefficient may be assigned to the pixel to obtain photoelectric random numbers. Alternatively, when values of electric signals for respective pixels include a value with a decimal place, the value with a decimal place may be rounded to an integer to obtain photoelectric random numbers.

Note that pixel positions do not necessarily have to be shuffled to generate an encryption key, as described above, and values of electric signals for respective pixels may be used as an encryption key with no change.

Here, pseudorandom numbers generated by software are conventionally often used as random numbers used for encryption. However, pseudorandom numbers are generated using an algorithm that calculates a numerical value, and true random numbers are not generated. Thus, an encryption key may be decrypted to be replicated.

On the other hand, the photoelectric random numbers described above can be true random numbers, and it is possible to make it more difficult to decrypt an encryption key by generating the encryption key on the basis of the photoelectric random numbers.

Note that photoelectric random numbers may be used for the above-described encryption of a hash value. Specifically, a private key used for encryption may be generated on the basis of photoelectric random numbers. This makes it difficult to decrypt the private key, and thus makes it possible to enhance the security.

2-2. Regarding Encryption-Target Signal

The following is a conventional method for encrypting an image signal obtained by image-capturing performed by the array sensor 10. In general, the image signal read from the array sensor 10 is once stored in a memory in the form of a plaintext, and the stored image signal is encrypted.

However, the adoption of such an encryption method enables hacking that includes intentionally causing an error at the timing of encryption using, for example, malware, outputting a content of memory in the form of a dump file, and copying a plaintext stored in the memory.

Thus, in the present embodiment, a signal read from a pixel of the array sensor 10 is encrypted to prevent an image signal from being stored in a memory in the form of a plaintext.

Figure 11:
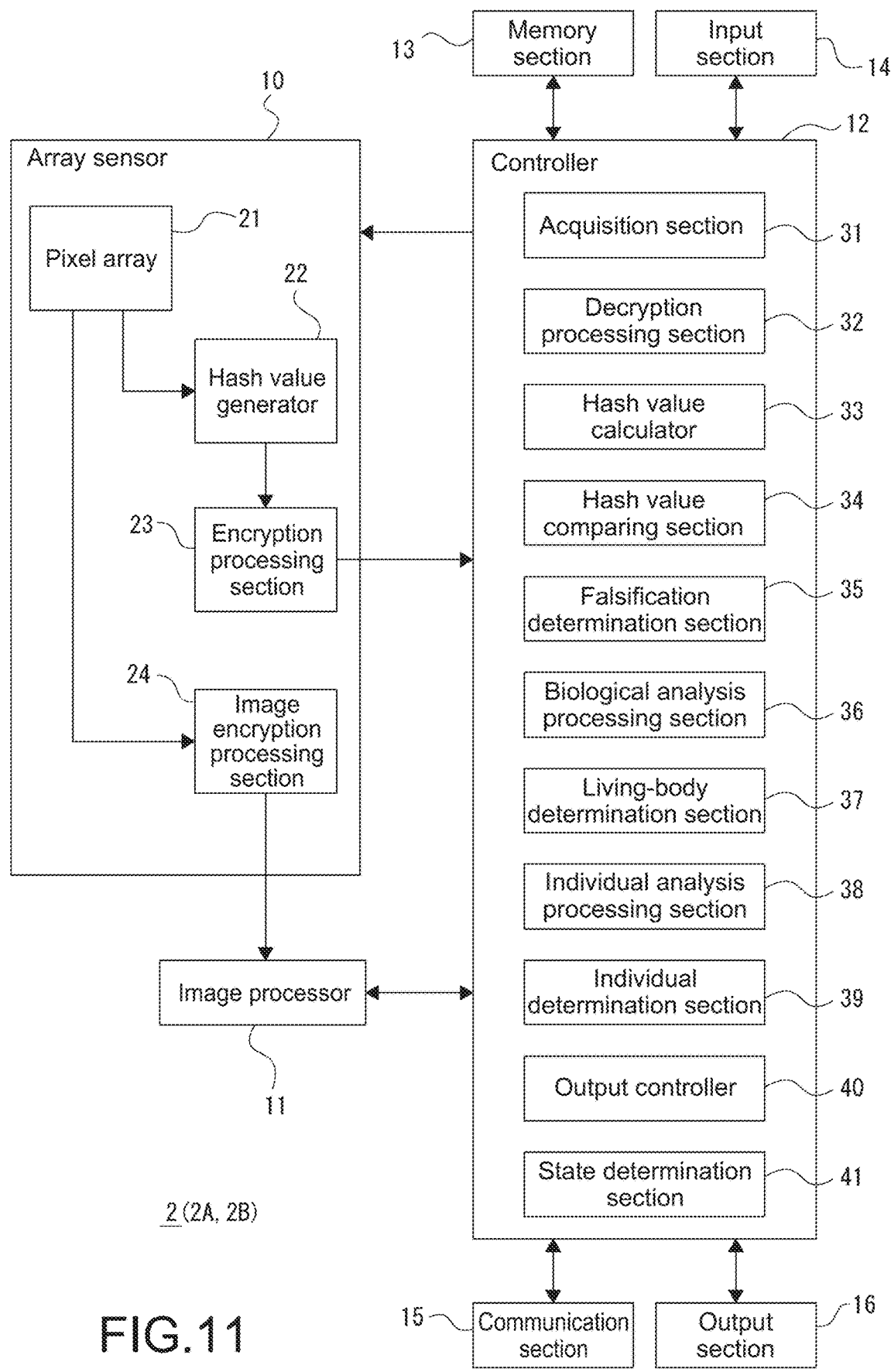
FIG. 11 is a block diagram illustrating an example of a configuration of the inside of the user terminal according to a second embodiment.

Specifically, in this example, the image encryption processing section 24 illustrated in FIG. 11 performs an amplitude control on a signal read from a pixel of the array sensor 10, using a coefficient depending on the encryption key (encryption filter) illustrated in FIG. 12, and this results in encrypting the read signal.

Figure 13:
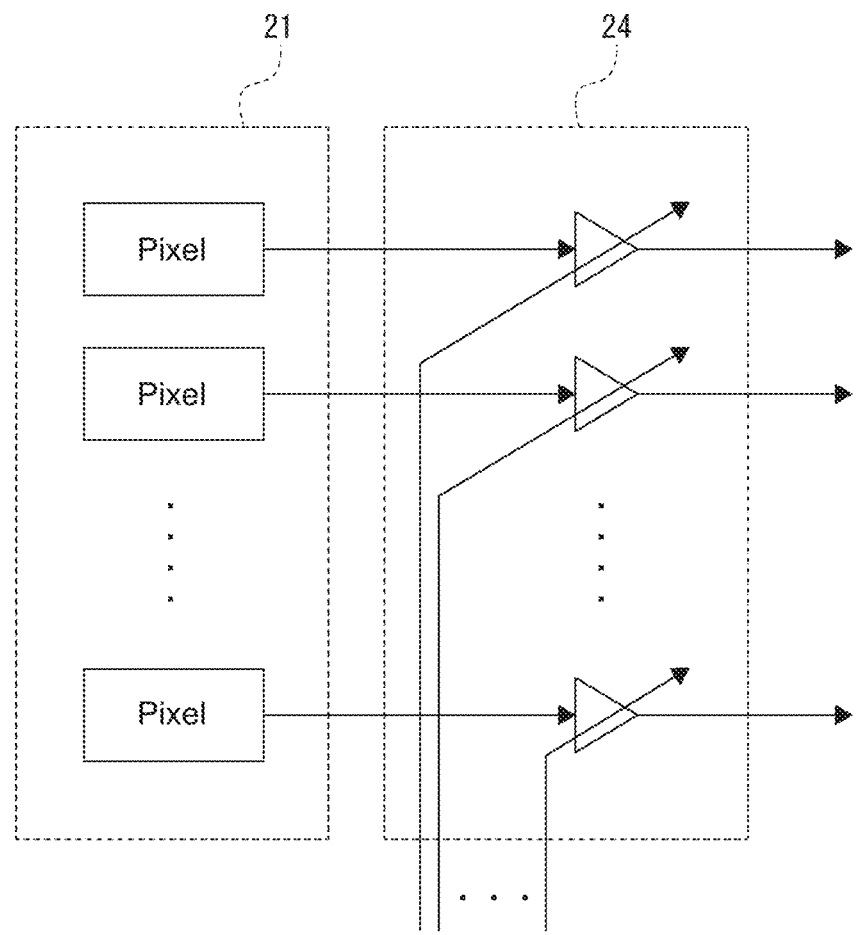
FIG. 13 is a notion diagram used to describe an encryption of a read signal that is performed by an amplitude control according to the second embodiment being performed.

FIG. 13 illustrates a notion of an encryption of a read signal that is performed by the image encryption processing section 24.

As illustrated in the figure, a value of a signal (in this case, a charge signal) read from each pixel in the pixel array 21 of the array sensor 10 is multiplied by a coefficient depending on an encryption key using an amplifier that is included in the image encryption processing section 24. In the image encryption processing section 24 of the user terminal 2 illustrated in FIG. 11, an amplitude control is performed on a read signal for each pixel in the form of an analog signal, as described above, and then image data for each frame is temporarily stored in a buffer. The image data temporarily stored in the buffer is read at an appropriate timing to be provided to, for example, the image processor 11.

In other words, the image encryption processing section 24 sets, for the amplifier described above, a coefficient depending on an encryption key so that a signal read from each pixel in the array sensor 10 is encrypted.

Note that FIG. 13 is merely a notion diagram, and an amplifier does not necessarily have to be provided for each pixel in the image encryption processing section 24. For example, one amplifier included in the image encryption processing section 24 may be shared by the respective pixels when bulk readouts are performed, as in the case of using a charge-coupled device (CCD) image sensor. Note that, in this case, an amplitude control for each pixel is performed by time division.

The example of encrypting a read signal in the form of an analog signal has been described above as an example of encrypting a read signal. However, a read signal in the form of a digital signal that is obtained by an A/D conversion being performed may also be encrypted.

Note that it is very difficult to fraudulently acquire an analog signal from outside. Thus, the adoption of a configuration in which an analog read signal is encrypted makes it possible to enhance the security.

Note that, when an analog read signal is encrypted, this may result in a reduction in the reproducibility of an image obtained by decrypting an encrypted image.

However, when, for example, the image obtained by decrypting an encrypted image is used to analyze whether a subject appearing in a target image is a living body, it is sufficient if biological analysis processing can be sufficiently performed with the degree of reproducibility of the image. Thus, there seems to be no practical issue. The same applies to the case of performing processing of individually analyzing a subject appearing in a target image.

On the other hand, when a digital read signal is encrypted, the accuracy in encryption processing is improved. This results in being able to improve the reproducibility of the image.

Note that the above-described encryption of a read signal is a type of encryption using stream ciphering. The stream ciphering is ciphering used to encrypt a plaintext for each piece of specified data, that is, for example, for each bit or for each byte.

In the stream ciphering, it is not necessary that encryption-target signals have equal data lengths, and thus there is no need for preprocessing performed before a target signal is encrypted. Thus, the adoption of the stream ciphering makes it possible to speed up the encryption processing.

Note that encrypted captured-image data also ends up being obtained as target data for a digital signature when an analog read signal is encrypted. From this point of view, it is assumed that, herein, the encrypting an analog signal is included in encrypting captured-image data.

2-3. Processing Performed on Transmission Side

Figure 14:
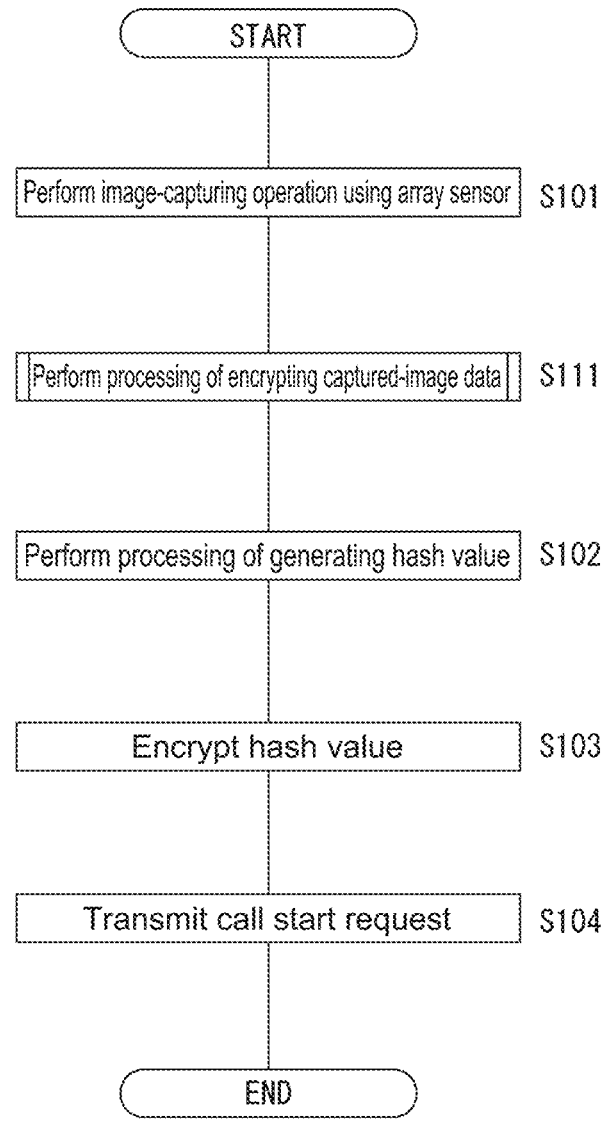
FIG. 14 is a flowchart illustrating processing performed by the user terminal on the transmission side in a video chat system according to the second embodiment.

FIG. 14 illustrates an example of processing performed by the user terminal 2A on the transmission side according to the second embodiment. Note that a process similar to the process being illustrated in FIG. 9 and performed on the transmission side in the first embodiment is denoted by a reference numeral similar to a reference numeral of the process in the first embodiment, and a description thereof is omitted as appropriate.

In Step S101, by use of a camera function, the controller 12 of the user terminal 2A performs an image-capturing operation using the array sensor.

The user terminal 2A performs processing of encrypting captured-image data in Step S111. The processing of encrypting captured-image data is performed by the image encryption processing section 24 of the array sensor 10.

The processing of encrypting captured-image data is specifically described with reference to FIG. 15. Note that at least a portion of the processing described below may also be provided as processing performed by hardware.

In Step S301, the image encryption processing section 24 acquires captured-image data generated by performing an operation of capturing a still image. The captured-image data is still-image data from which an encryption key is generated, and is obtained by the array sensor 10 capturing an image for one frame (reading a charge for each pixel) in response to an instruction being given by the controller 12.

The acquisition of still-image data in Step S301 results in image data that is a seed frame being stored in, for example, a memory included in the array sensor 10.

In Step S302, which is subsequent to Step S301, the image encryption processing section 24 performs processing of checking the uniformity of pixel values. This processing of checking the uniformity is processing of checking the uniformity of brightness values of respective pixels in the seed frame. Specifically, the image encryption processing section 24 counts the number of pixels of which a brightness value is zero or the number of pixels of which a brightness value is a saturation value (a largest value).

Note that processing of checking the uniformity of values of read signals may also be performed as the processing of checking the uniformity.

In Step S303, which is subsequent to Step S302, the image encryption processing section 24 determines whether the uniformity is excessive. Specifically, the image encryption processing section 24 determines whether the number of pixels counted in Step S302 is equal to or greater than a specified threshold (for example, a value corresponding to 30% to 50% of valid pixels).

When the image encryption processing section 24 has obtained a determination result showing that the number of pixels counted in Step S302 is equal to or greater than the threshold, and the uniformity is excessive, the image encryption processing section 24 moves on to Step S304 to perform processing of deleting the seed frame, that is, processing of deleting the image data corresponding to the seed frame and being stored in, for example, the memory, and then the image encryption processing section 24 returns to Step S301.

This results in being able to capture an image corresponding to a seed frame again when the degree of randomness of pixel values of a seed frame is low. In other words, photoelectric random numbers can be acquired again when the degree of randomness of photoelectric random numbers is low.

This makes it possible to prevent encryption from being performed using an encryption key based on random numbers with a low degree of randomness, and thus to enhance the security.

On the other hand, when, in Step S303, the image encryption processing section 24 has obtained a determination result showing that the number of pixels counted is less than the threshold, and the uniformity is not excessive, the image encryption processing section 24 moves on to Step S305 to generate an encryption key. Specifically, in this example, an encryption key that represents coefficients that are to be set for respective amplifiers included in the image encryption processing section 24 is generated on the basis of brightness values of respective pixels in the seed frame.

In this example, in the process of Step S305, an encryption key is not generated on the basis of photoelectric random numbers obtained by assigning, with no change, brightness values for respective pixels to pixel positions at which the brightness values are actually obtained. The encryption key is generated on the basis of photoelectric random numbers obtained by assigning at least a portion of the brightness values for the respective pixels to pixel positions that are different from pixel positions at which the assigned brightness values are actually obtained.

This makes it more difficult to decrypt an encryption key, and thus makes it possible to enhance the security.

In Step S306, which is subsequent to Step S305, the image encryption processing section 24 performs processing of deleting the seed frame, that is, processing of deleting the image data corresponding to the seed frame and being stored in, for example, the memory by the acquisition processing in Step 301.

When the processing of deleting the seed frame is performed, this makes it possible to prevent an image from which photoelectric random numbers are generated from leaking out, and to prevent the photoelectric random numbers from being estimated.

Note that, when, for example, the image encryption processing section 24 has a great processing capability or the image size of a seed frame is small, the seed frame does not necessarily have to be stored in, for example, the memory. In this case, there is no need for the deletion processing of Step S306 and the deletion processing of Step S304.

Subsequently, in Step S307, the image encryption processing section 24 deletes an existing key if any. When, for example, the processing illustrated in FIG. 15 is started at regular time intervals, the image encryption processing section 24 holds an encryption key as a result of performing the processing of Step S308 in the past. The process of Step S307 corresponds to processing of deleting a held existing encryption key, as described above.

When such processing of deleting an existing key is performed, this makes it possible to prevent an encryption key used for encryption in the past from leaking out, and to prevent a signal encrypted in the past from being fraudulently decrypted.

Subsequently, in Step S308, the image encryption processing section 24 performs processing of storing the encryption key. In other words, processing of storing, in a memory 16, the encryption key generated in Step S305 is performed.

Note that the processes of Steps S307 and S308 may be simultaneously performed by overwriting an existing encryption key with a new encryption key and storing the new encryption key.

Figure 15:
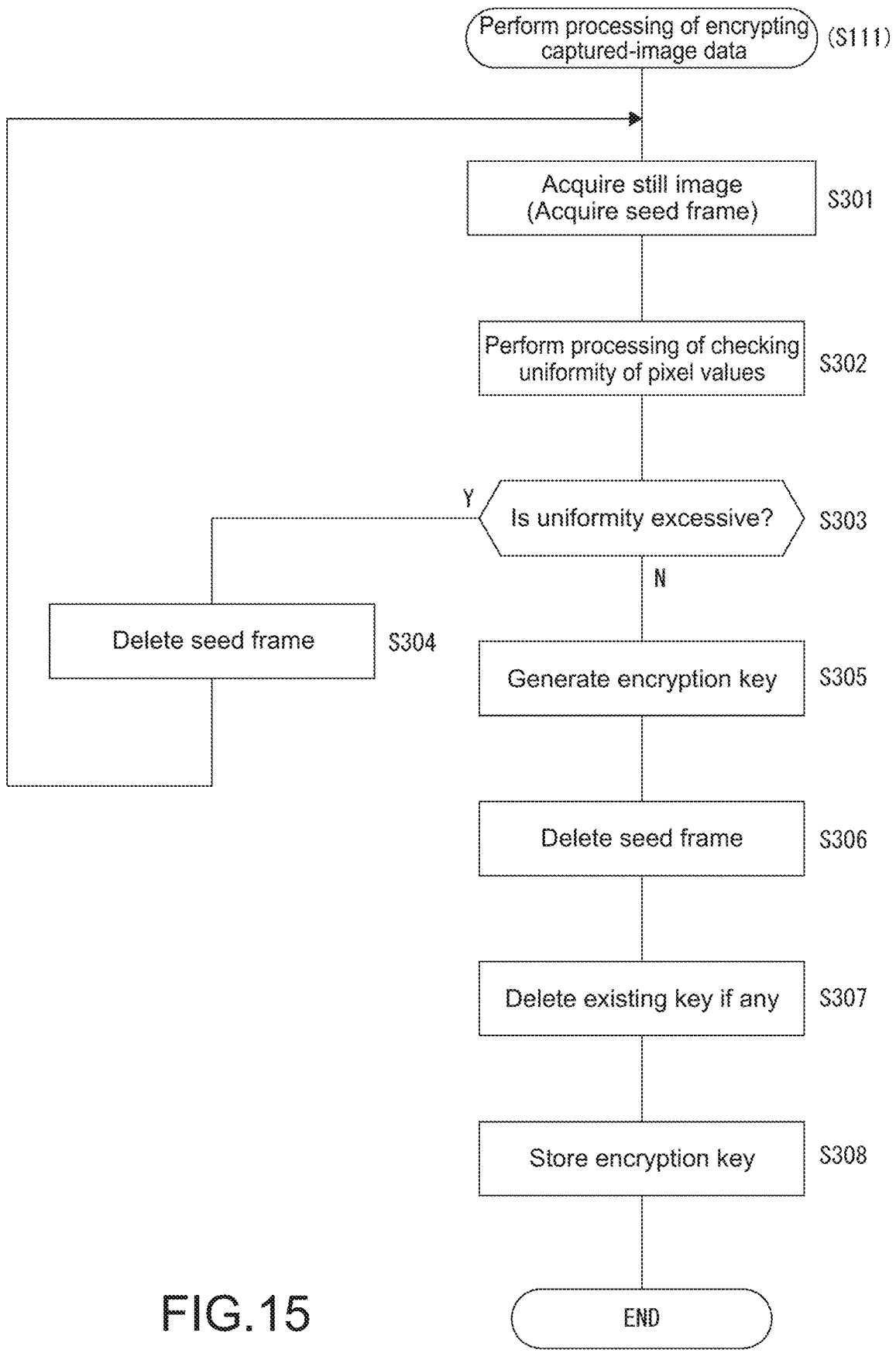
FIG. 15 is a flowchart of processing of encrypting captured-image data according to the second embodiment.

In response to the storing processing of Step S308 being performed, the image encryption processing section 24 terminates the series of processes illustrated in FIG. 15.

In the user terminal 2A, image data (captured-image data) obtained by image-capturing being performed by the array sensor 10 is encrypted using the encryption key stored in Step S308. Specifically, after the processing illustrated in FIG. 15 is terminated, the image encryption processing section 24 sets, for respective amplifiers, coefficients for respective pixels based on the stored encryption key, so that an image signal obtained by image-capturing being performed by the array sensor 10 is encrypted on the basis of the stored encryption key.

In this example, the array sensor 10 captures a moving image, and the image encryption processing section 24 encrypts respective frame images included in the moving image.

In this example, captured-image data that is a moving image and is encrypted as described above is stored in the memory section 13 under the control of the controller 12. The controller 12 can transmit the captured-image data stored in the memory section 13, as described above, to the user terminal 2B through the communication section 15.

As will be appreciated from the description above, in this example, image data is encrypted on the basis of photoelectric random numbers obtained during a frame period that is different from a frame period of encryption-target image data.

This makes it more difficult to estimate an encryption key from an encrypted image, and thus makes it possible to enhance the security.

Note that image data may also be encrypted on the basis of photoelectric random numbers obtained during the same frame period as encryption-target image data.

Note that the image encryption processing section 24 can also perform the processing illustrated in FIG. 15 when an unauthorized access is detected.

When the processing illustrated in FIG. 15 is started in response to an unauthorized access being detected, photoelectric random numbers are acquired (Step S301) and an encryption key is generated (Step S305) in response to an unauthorized access being detected. In other words, photoelectric random numbers are reacquired in response to an unauthorized access being detected, and an encryption key is regenerated on the basis of the reacquired photoelectric random numbers. This results in tamper-proof software.

Return to the description of FIG. 14.

The controller 12 of the user terminal 2A generates a hash value in Step S102, performs processing of encrypting the hash value using a private key in Step S103, and transmits a call start request to the user terminal 2B (or the server apparatus 4) in Step S104.

Accordingly, the captured-image data, the encrypted hash value, and a public key are transmitted from the user terminal 2A to the user terminal 2B.

2-4. Processing Performed on Reception Side

Figure 16:
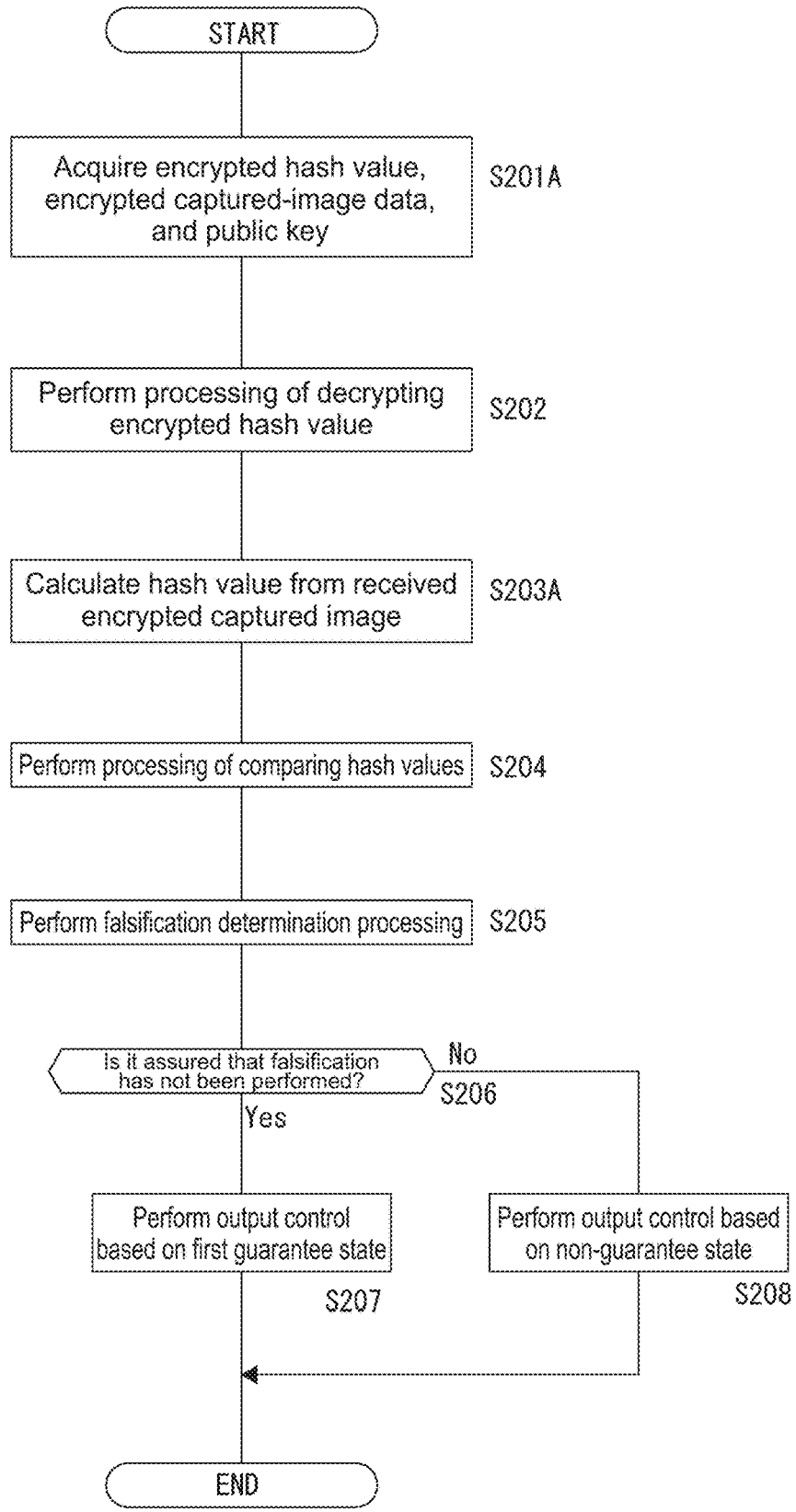
FIG. 16 is a flowchart illustrating processing performed by the user terminal on the reception side in the video chat system according to the second embodiment.

FIG. 16 illustrates an example of processing performed by the user terminal 2B on the reception side according to the second embodiment.

Note that a process similar to the process being illustrated in FIG. 10 and performed on the reception side in the first embodiment is denoted by a reference numeral similar to a reference numeral of the process in the first embodiment, and a description thereof is omitted as appropriate.

When the user terminal 2B receives each piece of data from the user terminal 2A and a video chat program is started in the user terminal 2B, the controller 12 of the user terminal 2B acquires the encrypted captured-image data, the encrypted hash value, and the public key in Step S201A.

Next, in Step S202, the controller 12 of the user terminal 2B performs processing of decrypting the encrypted hash value.

Subsequently, in Step S203A, the controller 12 of the user terminal 2B calculates a hash value from the encrypted captured image.

The controller 12 of the user terminal 2B performs processing of comparing the calculated hash value with the hash value obtained by the decryption in Step S204, performs falsification determination processing in Step S205, and performs branch processing depending on a result of the falsification determination in Step S206.

When the controller 12 of the user terminal 2B has determined that it is assured that falsification has not been performed, the controller 12 of the user terminal 2B performs an output control based on the first guarantee state ST1 in Step S207. When the controller 12 of the user terminal 2B has determined that there is no assurance that falsification has not been performed, the controller 12 of the user terminal 2B performs an output control based on the non-guarantee state ST0 in Step S208.

Accordingly, the first assurance icon MK1 or the non-assurance icon MK0 is displayed on the incoming call screen 50 presented to the user B.

3. THIRD EMBODIMENT

In the information processing system 1 according to a third embodiment, display is performed according to an assurance state of captured-image data received by the user terminal 2B on the reception side. Specifically, a screen display is performed according to the result of determination performed by the state determination section 41 with respect to captured-image data received from the user terminal 2A (the non-guarantee state ST0, the first guarantee state ST1, the second guarantee state ST2, and the third guarantee state ST3)

The system configuration, a configuration and a configuration of the user terminal 2, and the like of the third embodiment are similar to those described in the first embodiment. Thus, descriptions thereof are omitted. Therefore, a flow of processing performed by the user terminal 2A on the transmission side, and a flow of processing performed by the user terminal 2B on the reception side are described below.

3-1. Processing Performed on Transmission Side

For example, the user terminal 2A on the transmission side performs the respective processes illustrated in FIG. 9. However, biological analysis is performed in the third embodiment. The biological analysis is processing of extracting biological information from a plurality of still images. Thus, the image-capturing operation in Step S101 is performed to acquire a plurality of still images.

Further, in the processing of generating a hash value in Step S102, hash values are generated for respective pieces of data of the plurality of still-images. Further, in the encryption processing in Step S103, the generated hash values are each encrypted.

In the processing of transmitting a call start request in Step S104, the pieces of data of the plurality of captured images, the respective encrypted hash values, and a public key are transmitted to the user terminal 2B.

3-2. Processing Performed on Reception Side

Figure 17:
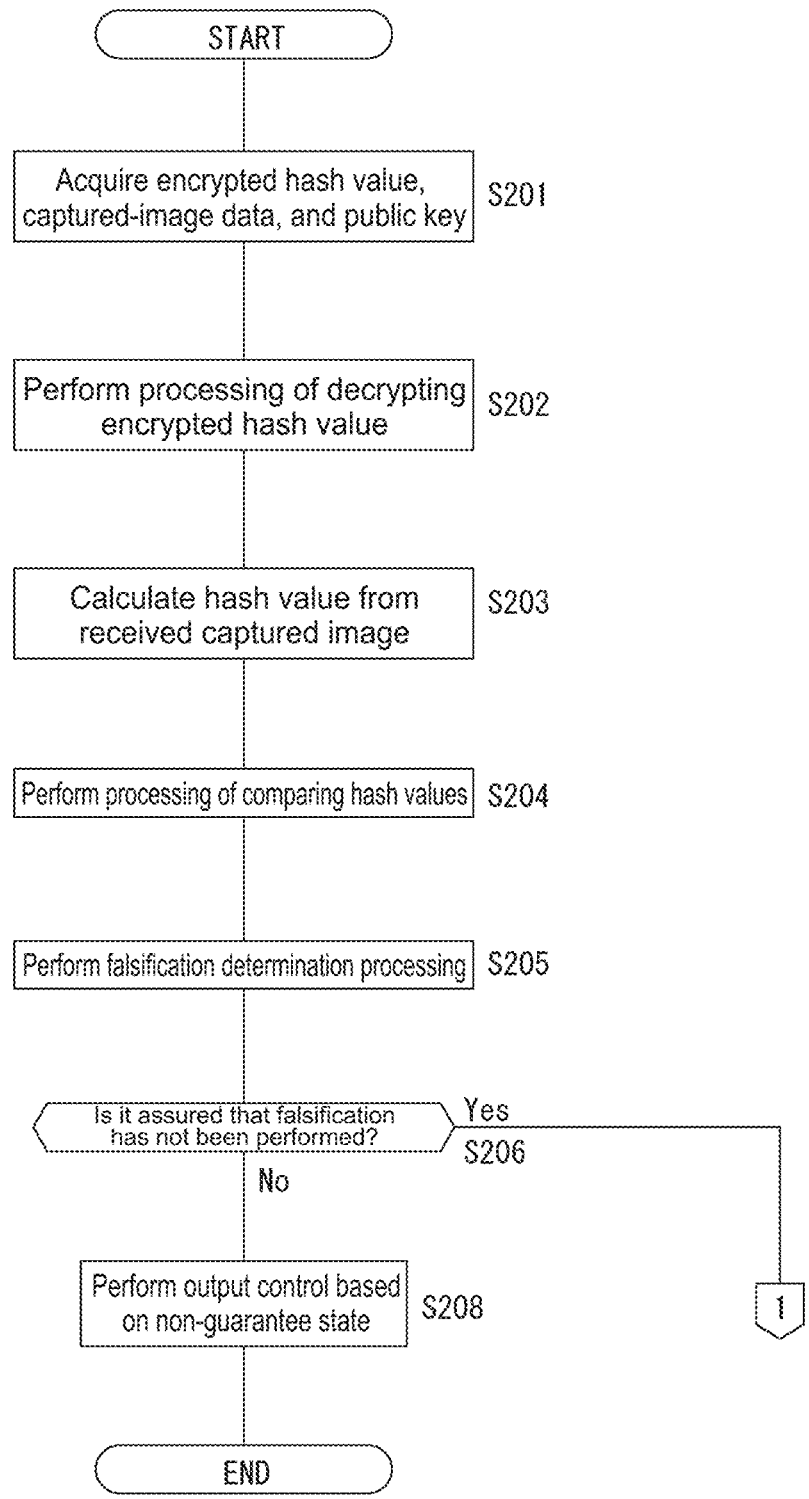
FIG. 17 is a flowchart illustrating processing performed by the user terminal on the reception side in a video chat system according to a third embodiment.
Figure 18:
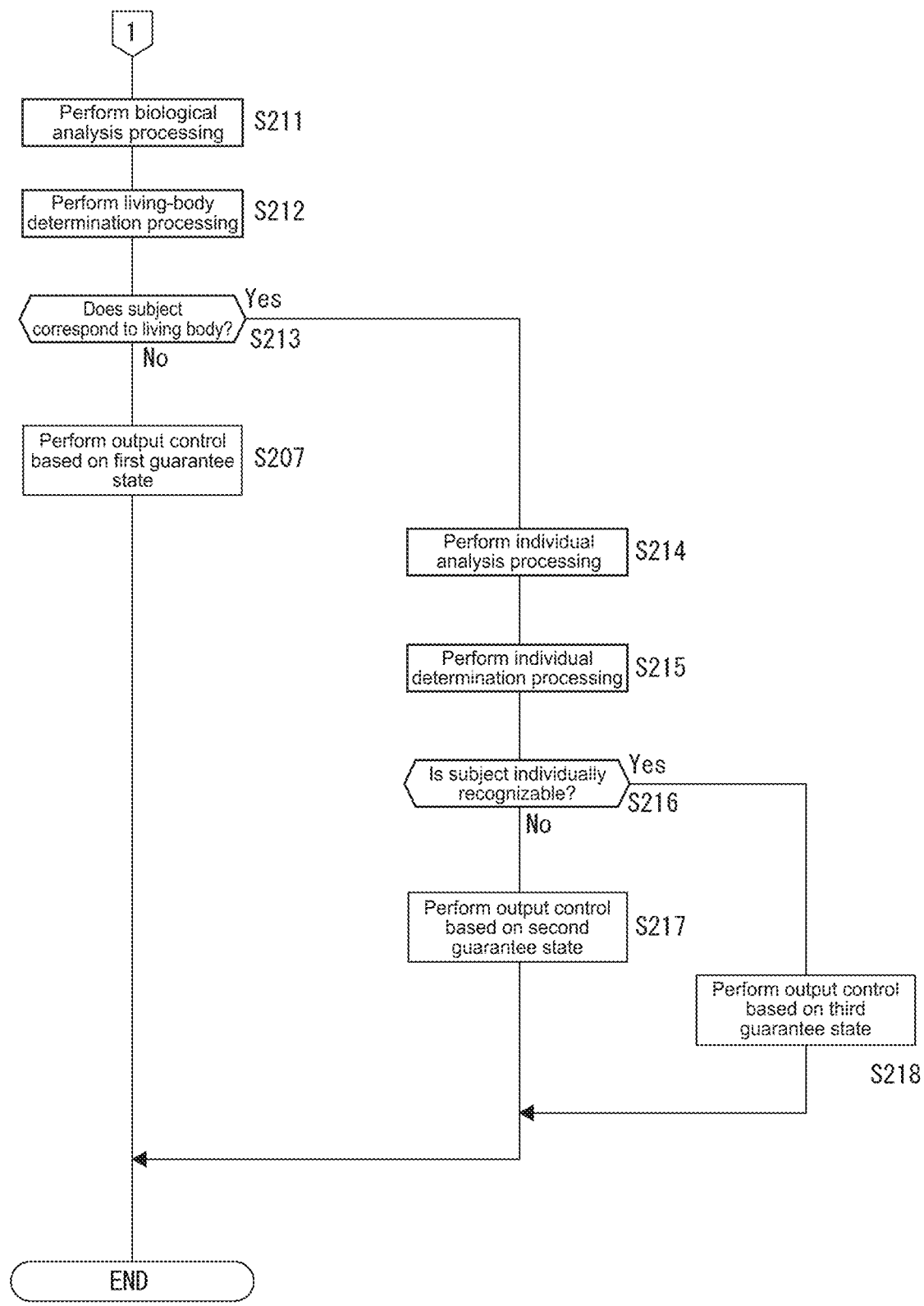
FIG. 18 is a flowchart illustrating the processing performed by the user terminal on the reception side in the video chat system according to the third embodiment.

In the third embodiment, the user terminal 2B on the reception side performs, for example, processing illustrated in FIG. 17 and processing illustrated in FIG. 18 by receiving captured-image data, an encrypted hash value, and a public key from the user terminal 2A.

Note that processes similar to the respective processes illustrated in FIG. 10 are respectively denoted by reference numerals similar to reference numerals of the processes of FIG. 10, and descriptions thereof are omitted as appropriate.

The controller 12 of the user terminal 2B performs the respective processes from Step S201 to Step S205 to determine whether it is assured that each received piece of captured-image data has not been falsified.

In Step S206, the controller 12 of the user terminal 2B performs branch processing depending on a result of performing falsification determination processing. Specifically, when there is no assurance that falsification has not been performed, the controller 12 of the user terminal 2B performs an output control based on the non-guarantee state ST0 in Step S208. Accordingly, the non-assurance icon MK0 and the explanatory text 63, as illustrated in FIG. 8, are displayed on the incoming call screen 50 presented to a user by the user terminal 2B.

On the other hand, when it has been determined that it is assured that falsification has not been performed, the controller 12 of the user terminal 2B performs the processing illustrated in FIG. 18.

Specifically, the controller 12 of the user terminal 2B performs biological analysis processing in Step S211. The biological analysis processing is processing of extracting biological information from a plurality of still images, and is processing of extracting information unique to a living body.

For example, the nystagmus can be detected from a living human. Although the nystagmus is not extracted from a piece of data of a captured image, the nystagmus can be detected by extracting information regarding a difference in a region situated around an eyeball between pieces of data of a plurality of captured images.

Alternatively, the heartbeat can be detected from a living human. The color of a human skin is slightly changed in time with the heartbeat. Such a change is extracted from pieces of data of a plurality of captured images.

Further, a brightness-evoked pupillary reaction, or lip-sync can be extracted from pieces of data of a plurality of captured images.

Such biological information is extracted in the biological analysis processing in Step S211.

Subsequently, the controller 12 of the user terminal 2B performs living-body determination processing in Step S212. This processing is processing of determining whether a subject is a living body on the basis of the extracted biological information. For example, when the nystagmus has been detected from pieces of data of a plurality of captured images as biological information, the subject is determined to be a living body.

In Step S213, the controller 12 of the user terminal 2B performs branch processing on the basis of a result of determining whether the subject is a living body.

When it has not been determined that the subject is a living body (or when it has been determined that the subject is not a living body), it is assured that captured-image data has not been falsified, but there is no assurance that the subject is a living body. In this case, the controller 12 of the user terminal 2B performs an output control based on the first guarantee state ST1 in Step S207. Accordingly, the first assurance icon MK1 and the explanatory text 63, as illustrated in FIG. 4, are displayed on the incoming call screen 50 presented to a user by the user terminal 2B.

On the other hand, when it has been determined that the subject is a living body, the controller 12 of the user terminal 2B performs individual analysis processing in Step S214.

The individual analysis processing is processing of extracting individual information that is performed to identify an individual from received captured-image data.

After the individual analysis processing is completed, the controller 12 of the user terminal 2B performs individual determination processing in Step S215. In the individual determination processing, an individual is determined on the basis of extracted individual information. In the individual determination processing, the subject may be individually specified, or it may be determined whether information with which the subject can be individually specified has been extracted.

In Step S216, the controller 12 of the user terminal 2B performs branch processing on the basis of a determination result obtained by performing the individual determination processing.

When the subject has not been individually specified, or when the information with which the subject can be individually specified has not been extracted, it is assured that captured-image data has not been falsified and the subject is a living body, but the subject has not been individually specified. In this case, the controller 12 of the user terminal 2B performs an output control based on the second guarantee state ST2 in Step S217.

Accordingly, the second assurance icon MK2 and the explanatory text 63, as illustrated in FIG. 6, are displayed on the incoming call screen 50 presented to a user by the user terminal 2B.

On the other hand, when the subject has been individually specified, or when the information with which the subject can be individually specified has been extracted, the controller 12 of the user terminal 2B performs an output control based on the third guarantee state ST3 in Step S218.

Accordingly, the third assurance icon MK3 and the explanatory text 63, as illustrated in FIG. 7, are displayed on the incoming call screen 50 presented to a user by the user terminal 2B.

As described above, the user terminal 2B displays the assurance icon 62 and the explanatory text 63 on the incoming call screen 50 according to whether there is a possibility that received captured-image data has been falsified, or according to information regarding the received captured-image data that can be extracted. This enables the user B to appropriately determine whether to answer an incoming call, and thus to prevent damage from being caused due to, for example, fraud.

Note that data of a moving image of a user on the transmission side that is actually presented to the user B, may be used as captured-image data used to perform falsification determination processing, biological analysis processing, and individual analysis processing. This results in there being no need to acquire captured-image data dedicatedly used to perform the falsification determination processing and the respective analysis processes. This makes it possible to reduce a processing load and the communication capacity.

3-3. Application Example

Note that the configurations described in the first embodiment, the second embodiment, and the third embodiment can be applied to a text chat system without sound.

Figure 19:
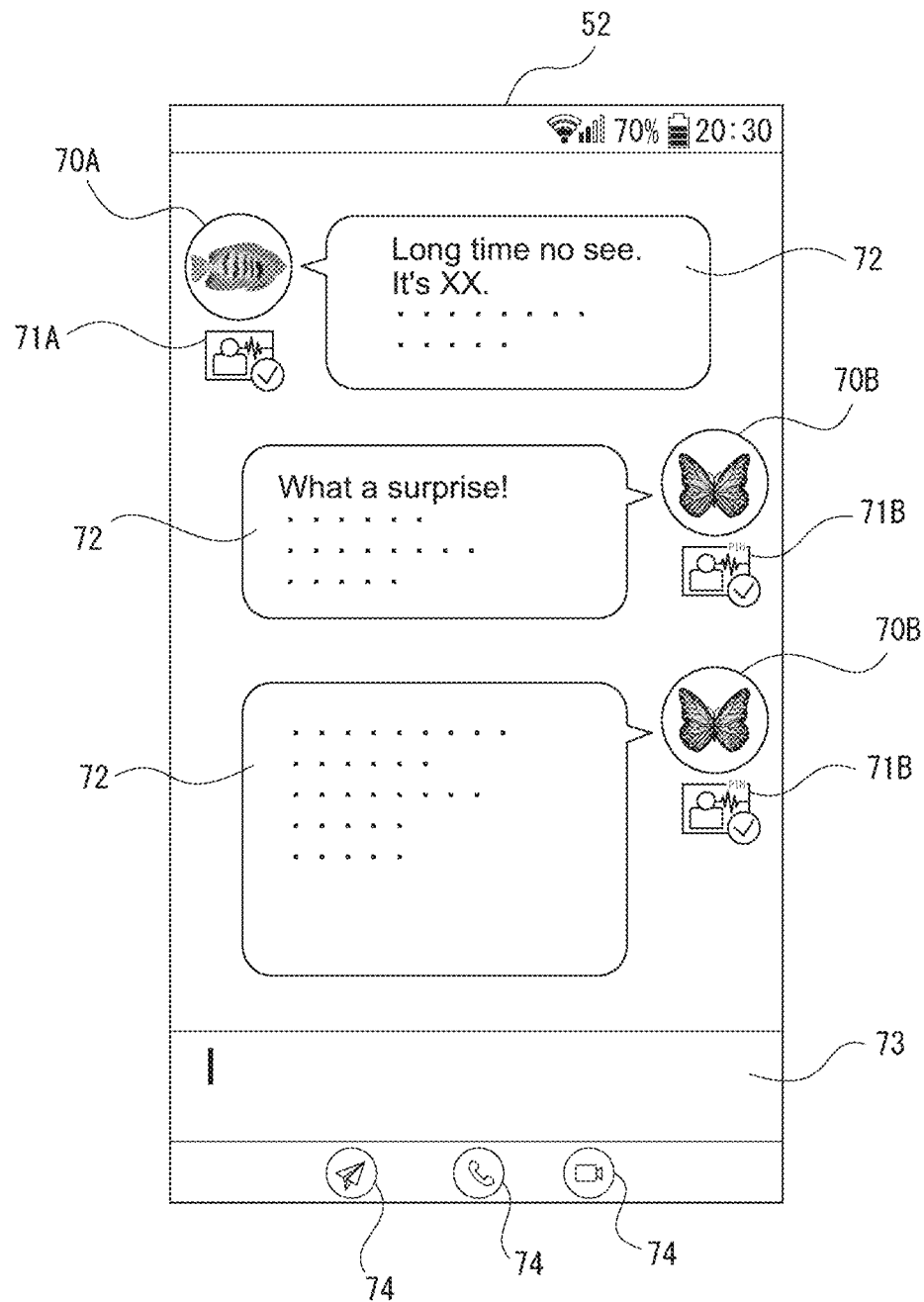
FIG. 19 illustrates an application example of the third embodiment, and illustrates an example of a text chat screen.

Specifically, the text chat system is described with reference to FIG. 19 illustrating a text chat screen 52 that is presented to a user who uses the text chat system.

A participant icon 70 that is set for each user participating in a chat, an assurance icon 71 that indicates an assurance state for each participant, a balloon 72 used to display a content of comment, an input field 73 to which the content of comment is input, and a functional icon 74 used to perform various functions are arranged on the text chat screen 52.

A participant icon 70A for a participant other than a user (the user B), and a participant icon 70B for the user are provided as the participant icons 70.

Further, an assurance icon 71A for a participant other than the user (the user B), and an assurance icon 71B for the user are provided as the assurance icons 71.

In the example of FIG. 19, the assurance icon 71A for the other user is the second assurance icon MK2, and the assurance icon 71B for the user is the third assurance icon MK3.

As described above, the assurance icon 71 depending on an assurance state of each participant is displayed.

Note that the assurance icon 71B for a user may be displayed at least on the text chat screen 52 presented to other participants. In other words, the assurance icon 71 for the user B does not have to be displayed on the text chat screen 52 presented to the user B. However, when the assurance icon 71 for a user is displayed on the text chat screen 52 presented to the user, this enables the user to grasp how his/her assurance state is displayed on the text chat screen 52 presented to other participants. Consequently, when the assurance state is not an intended state, an operation such as the various determination processes and analysis processes described above can be performed again.

In essence, there is no need to transmit captured-image data in the text chat system, which is different from the video chat system described above. However, in this application example, captured-image data is transmitted for falsification determination processing and various analysis processes. Thus, it is sufficient if captured-image data to be transmitted has a quality sufficient to perform the falsification determination processing and the analysis processing, and the resolution and the like of the captured-image data may be reduced. Further, when only the falsification determination processing is performed without performing the biological analysis processing or the individual analysis processing, captured-image data of which a resolution is reduced so that a subject is not recognized by a human, may be transmitted. This results in being able to reduce the risk of the leakage of captured-image data.

4. FOURTH EMBODIMENT

4-1. System Configuration

An information processing system 1A according to a fourth embodiment performs falsification determination processing, biological analysis processing, and individual analysis processing when a login or a new registration is performed in order to use various services.

Figure 20:
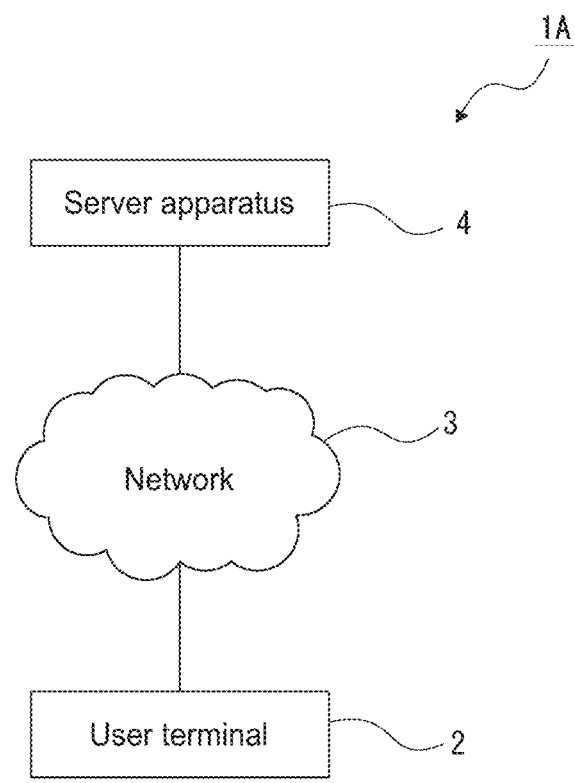
FIG. 20 schematically illustrates an example of a configuration of an information processing system according to a fourth embodiment.

FIG. 20 is a block diagram schematically illustrating an example of a configuration of the information processing system 1A.

The information processing system 1A includes the user terminal 2, the network 3, and the server apparatus 4.

The user terminal 2 is an information processing apparatus used by a user who uses various services (such as social networking services).

As in the first embodiment, there are various examples of the network 3, such as the Internet.

The server apparatus 4 is an information processing apparatus used to provide various services, and includes, for example, a function of managing user information and an application programming interface (API) function.

Note that, in the present embodiment, the server apparatus 4 performs the falsification determination processing and the various analysis processes.

Figure 21:
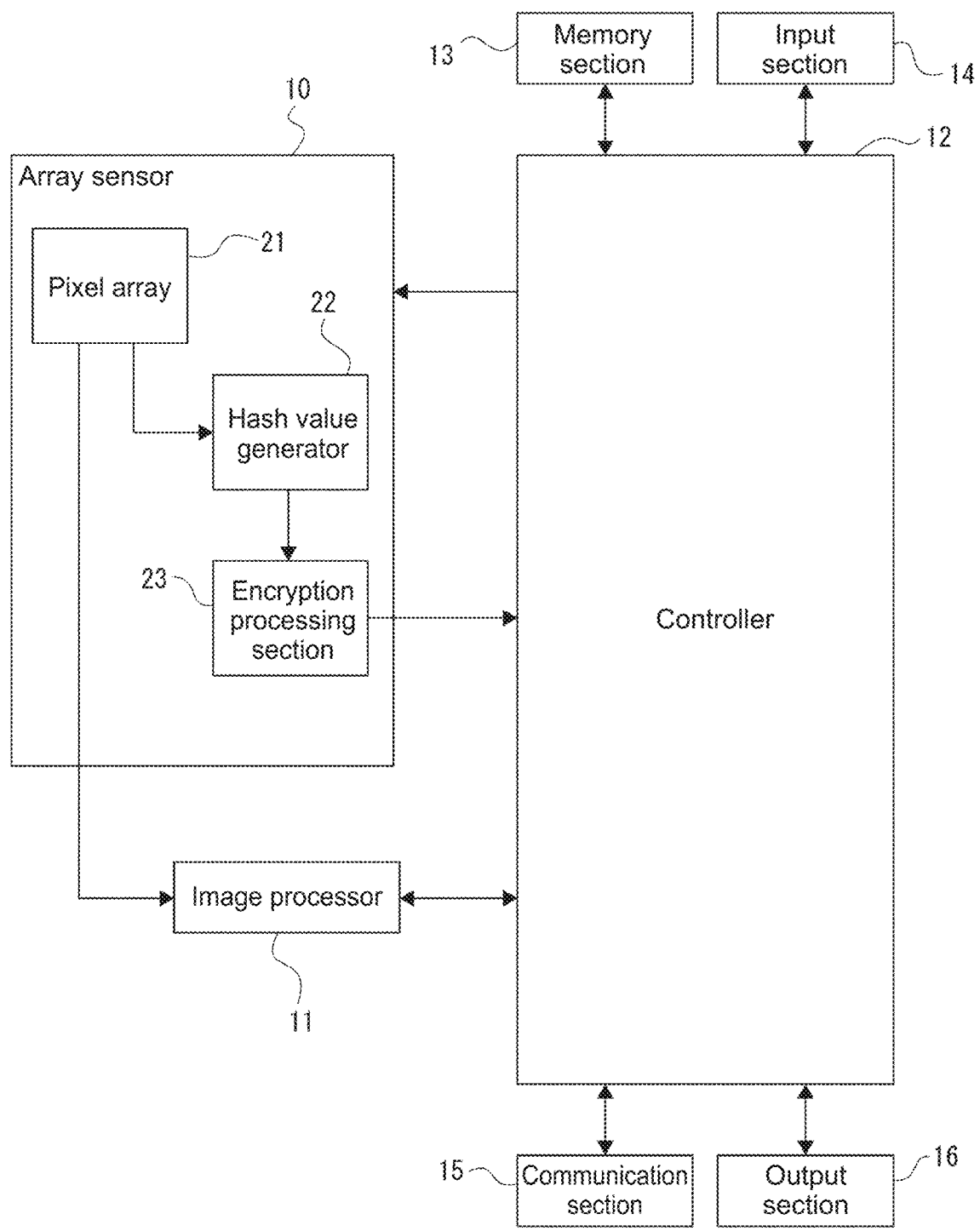
FIG. 21 is a block diagram illustrating an example of a configuration of the inside of the user terminal according to the fourth embodiment.

FIG. 21 illustrates an example of a configuration of the user terminal 2.

The user terminal 2 includes the array sensor 10 used to acquire target captured-image data for a digital signature, the image processor 11, the controller 12, the memory section 13, the input section 14, the communication section 15, and the output section 16. The controller 12 does not include the respective components illustrated in FIG. 2 such as the acquisition section 31. The array sensor 10, the image processor 11, the memory section 13, the input section 14, the communication section 15, and the output section 16 are similar to those described in the first embodiment. Thus, detailed descriptions thereof are omitted.

Figure 22:
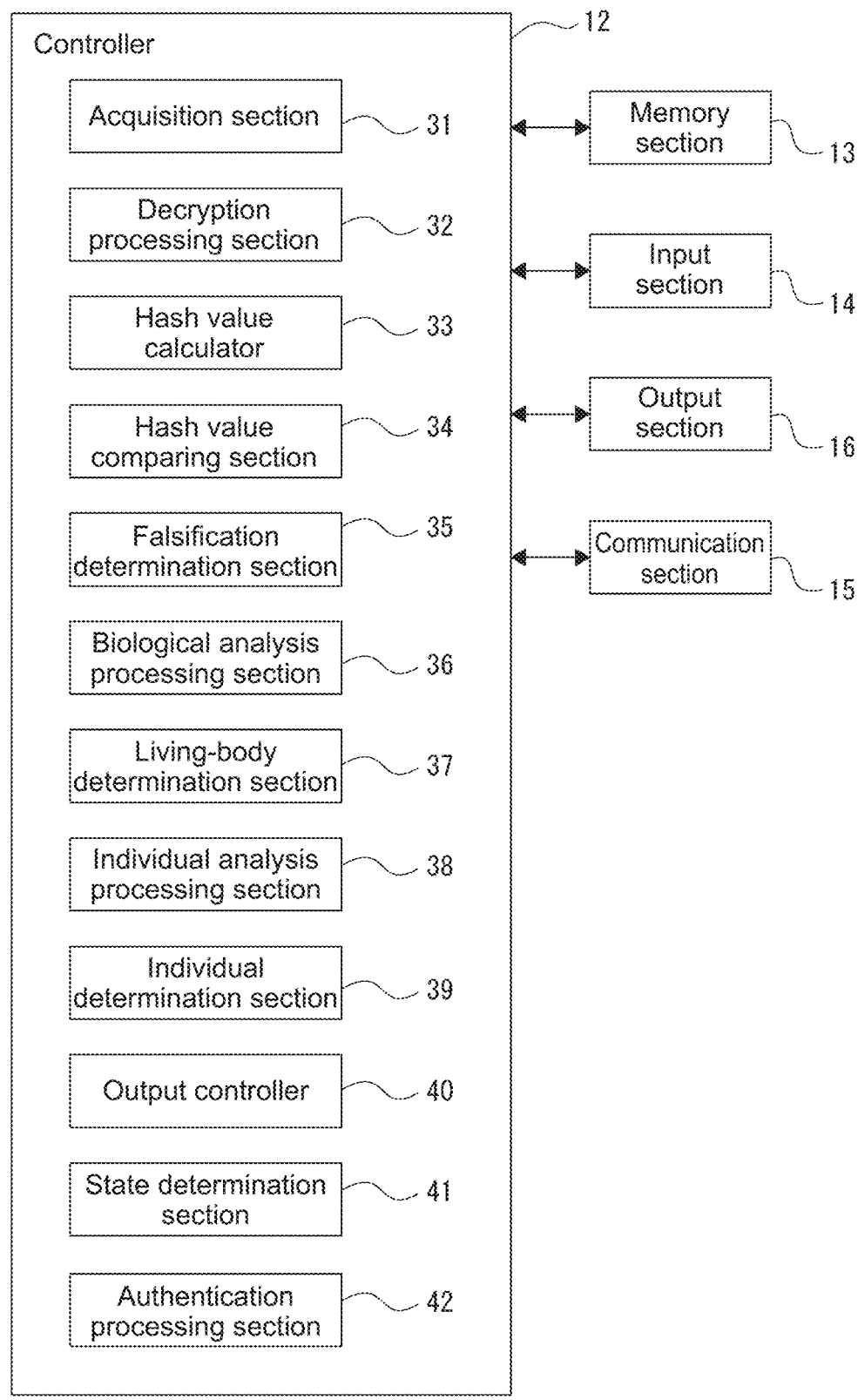
FIG. 22 is a block diagram illustrating an example of a configuration of the inside of a server apparatus according to the fourth embodiment.

FIG. 22 illustrates an example of a configuration of the server apparatus 4.

The server apparatus 4 includes the controller 12, the memory section 13, the input section 14, the communication section 15, and the output section 16.

The controller 12 includes various functions, and specifically includes the acquisition section 31, the decryption processing section 32, the hash value calculator 33, the hash value comparing section 34, the falsification determination section 35, the biological analysis processing section 36, the living-body determination section 37, the individual analysis processing section 38, the individual determination section 39, the output controller 40, the state determination section 41, and an authentication processing section 42.

The acquisition section 31, the decryption processing section 32, the hash value calculator 33, the hash value comparing section 34, the falsification determination section 35, the biological analysis processing section 36, the living-body determination section 37, the individual analysis processing section 38, the individual determination section 39, the output controller 40, and the state determination section 41 are similar to those included in the user terminal 2 of the first embodiment. Thus, detailed descriptions thereof are omitted.

The authentication processing section 42 performs authentication processing to determine whether a user is to be allowed to use services provided by the server apparatus 4. Specifically, processing of determining whether a person who uses the user terminal 2 matches a registered user is performed. Consequently, it is determined, for example, whether a login is allowed to be performed.

The memory section 13, the input section 14, the communication section 15, and the output section 16 are similar to those of the first embodiment. Thus, detailed descriptions thereof are omitted.

4-2. Login Screen

Figure 23:
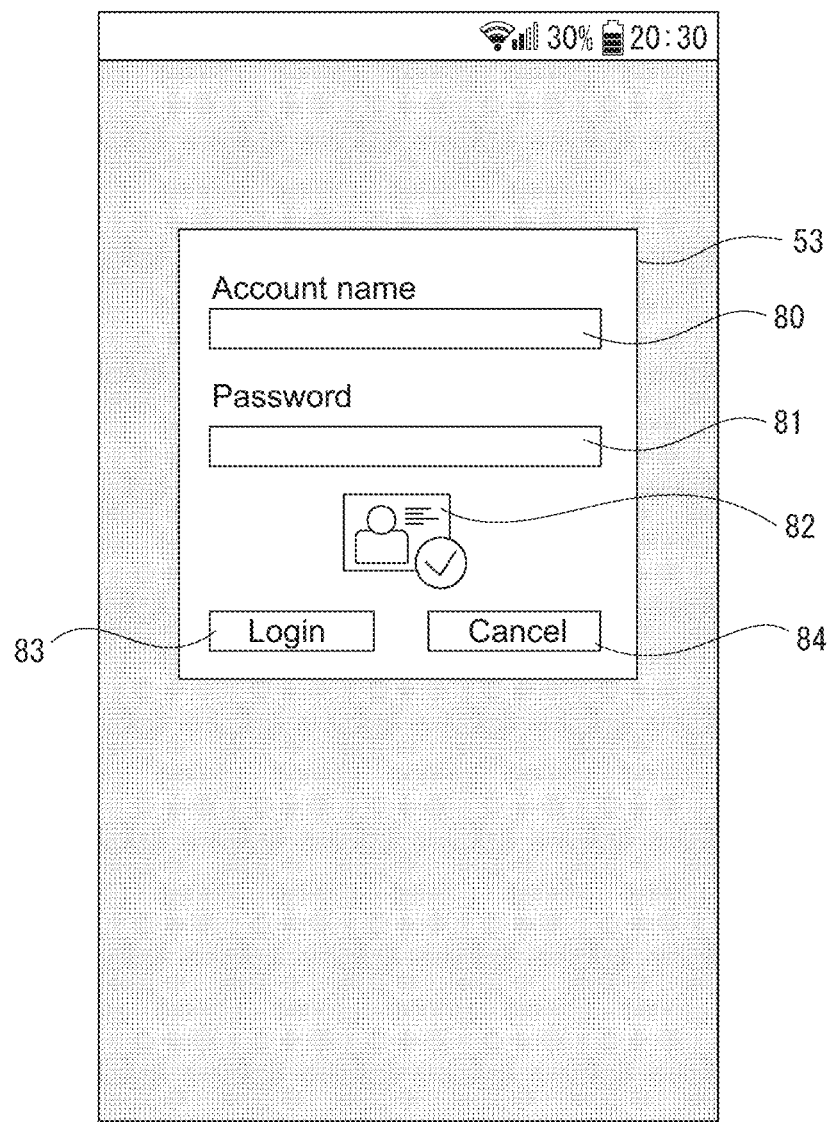
FIG. 23 illustrates an example of a login screen in the information processing system according to the fourth embodiment.

For example, a login screen 53 illustrated in FIG. 23 is displayed when a user performs an operation of displaying a login screen using the user terminal 2 to use services provided by the server apparatus 4.

Note that FIG. 23 illustrates an example in which a modal window that is the login screen 53 is superimposed to be displayed on an originally displayed screen.

The login screen 53 includes, for example, an ID input field 80 to which an account name (or a user identification (ID), an e-mail address, or the like is also acceptable) is input, a password input field 81 to which a password is input, an assurance icon 82, a login button 83 used to make a request that the server apparatus 4 perform authentication processing, and a cancellation button 84 used to cancel a login operation.

The user can cause the server apparatus 4 to perform authentication processing by inputting respective specified words to the ID input field 80 and the password input field 81 and then pressing the login button 83.

When the login screen 53 is displayed, the user terminal 2 performs an image-capturing operation and transmits captured-image data, a hash value, and a public key to the server apparatus 4. Then, the assurance icon 82 is displayed according to a determination result obtained by falsification determination processing being performed by the server apparatus 4.

In other words, the assurance icon 82 is displayed in order to present to the user what kind of assurance the server apparatus 4 has provided with respect to data of an image captured using the user terminal 2 (such as a degree of assurance).

The assurance icon 82 is displayed according to a content of processing performed by the server apparatus 4. When the server apparatus 4 only performs falsification determination processing, one of the non-assurance icon MK0 and the first assurance icon MK1 is displayed.

Further, when the server apparatus 4 performs not only the falsification determination processing but also living-body determination processing or individual determination processing, one of the non-assurance icon MK0, the first assurance icon MK1, the second assurance icon MK2, and the third assurance icon MK3 is displayed.

4-3. Processing Performed by User Terminal

An example of processing performed by the controller 12 of the user terminal 2 according to the fourth embodiment is described with reference to FIG. 24.

Note that a process similar to the process being illustrated in FIG. 9 and performed by the user terminal 2 is denoted by a reference numeral similar to a reference numeral of the process being illustrated in FIG. 9 and performed by the user terminal 2, and a description thereof is omitted as appropriate.

When an operation for displaying the login window 53 is performed by a user, the controller 12 of the user terminal 2 starts a camera function and performs an image-capturing operation using the array sensor in Step S101.

Subsequently, the controller 12 of the user terminal 2 generates a hash value from captured-image data in Step S102, and performs processing of encrypting the hash value in Step S103.

The controller 12 of the user terminal 2 transmits the captured-image data, the encrypted hash value, and a public key to the server apparatus 4 in Step S121. Note that the transmission-target captured-image data may be encrypted. In this case, it is sufficient if the process of Step S111 of FIG. 14 is performed before the captured-image data is transmitted to the server apparatus 4.

The controller 12 of the user terminal 2 determines, in Step S122, whether an operation of inputting a word has been detected. When the operation of inputting a word has been detected, the controller 12 of the user terminal 2 performs processing of displaying an input word in a corresponding input field (the ID input field 80, the password input field 81) in Step S123. Note that a specified word or mark (such as "*") is displayed in the password input field 81 instead of an input word such that the input word is not recognized.

After the controller 12 of the user terminal 2 performs the process of Step S123, the controller 12 of the user terminal 2 returns to the process of Step S122.

When the operation of inputting a word has not been detected, the controller 12 of the user terminal 2 determines whether determination-result information has been received from the server apparatus 4 in Step S124.

When determination processing such as a result of falsification determination processing has been received, the controller 12 of the user terminal 2 performs processing of displaying the assurance icon 82 on the login screen 53 in Step S125. Note that, when a new determination result is received in a state in which the assurance icon 82 is being displayed, processing of updating the assurance icon 82 may be performed as the process of Step S125.

When the determination-result information has not been received from the server apparatus 4, the controller 12 of the user terminal 2 determines, in Step S126, whether pressing of the login button 83 has been detected.

Figure 24:
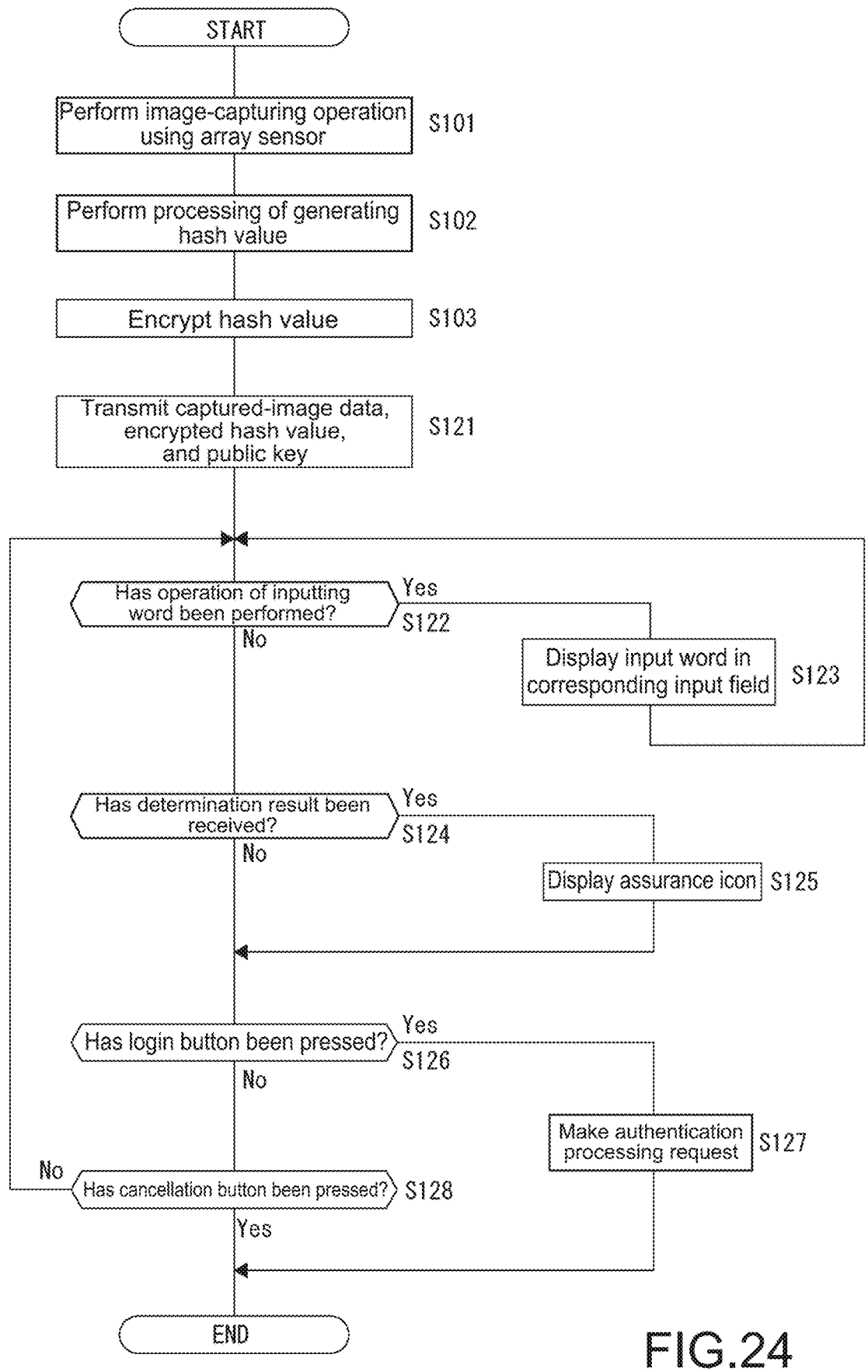
FIG. 24 is a flowchart illustrating processing performed by the user terminal in the information processing system according to the fourth embodiment.

When the pressing of the login button 83 has been detected, the controller 12 of the user terminal 2 performs processing of transmitting an authentication processing request to the server apparatus 4 in Step S127, and then terminates the series of processes illustrated in FIG. 24. Note that the display of the login screen 53 may be stopped when the series of processes is terminated.

When the pressing of the login button 83 has not been detected, the controller 12 of the user terminal 2 determines, in Step S128, whether the pressing of the cancellation button 84 has been detected.

When the pressing of the cancellation button 84 has been detected, the controller 12 of the user terminal 2 terminates the series of processes illustrated in FIG. 24.

On the other hand, when the pressing of the cancellation button 84 has not been detected, the controller 12 of the user terminal 2 returns to the process of Step S122.

In other words, the controller 12 of the user terminal 2 sequentially performs the respective processes of Steps S122, S124, S126, and S128 to confirm whether an operation of inputting a word, an operation of pressing each button, or reception of a determination result has been detected. When one of the operations has been detected, the controller 12 of the user terminal 2 performs a corresponding process (the process of Step S123, S125, or S127).

4-4. Processing Performed by Server Apparatus

An example of processing performed by the server apparatus 4 according to the fourth embodiment is described.

Note that a process similar to the process illustrated in FIG. 10 is denoted by a reference numeral similar to a reference numeral of the process of FIG. 10, and a description thereof is omitted as appropriate.

Figure 25:
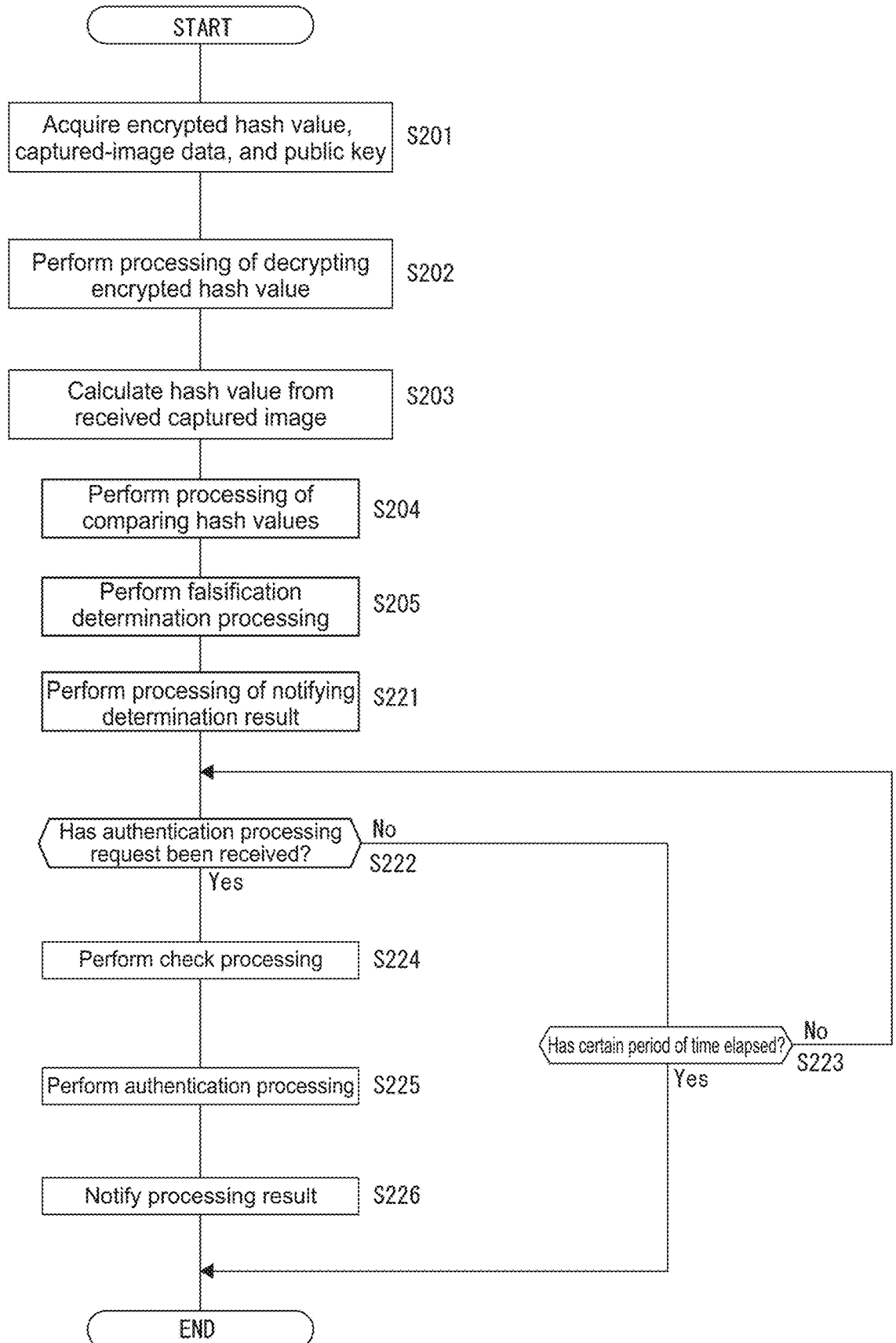
FIG. 25 is a flowchart illustrating processing performed by the server apparatus in the information processing system according to the fourth embodiment.

In response to receiving captured-image data, an encrypted hash value, and a public key from the user terminal 2, the controller 12 of the server apparatus 4 starts a series of processes illustrated in FIG. 25.

Specifically, the controller 12 of the server apparatus 4 acquires captured-image data, an encrypted hash value, and a public key in Step S201, performs processing of decrypting the encrypted hash value in Step S202, calculates a hash value from the received captured-image data in Step S203, performs processing of comparing the hash values in Step S204, and performs falsification determination processing in Step S205.

Subsequently, in Step S221, the controller 12 of the server apparatus 4 performs processing of notifying the user terminal 2 of a determination result obtained by the falsification determination processing being performed.

This results in notifying the user terminal 2 whether it is assured that the captured-image data has not been falsified. In the user terminal 2, the assurance icon 62 corresponding to the notification is displayed on the login screen 53 (the process of Step S125 in FIG. 24).

Note that the controller 12 of the server apparatus 4 may perform, for example, biological analysis processing, living-body determination processing, individual analysis processing, and individual determination processing in addition to the falsification determination processing of Step S205. In this case, notification processing is performed according to a result of the falsification determination processing, a result of the living-body determination processing, and a result of the individual determination processing, and one of the non-assurance icon MK0, the first assurance icon MK1, the second assurance icon MK2, and the third assurance icon MK3 is displayed on the login window 53 in the user terminal 2.

Return to the description of FIG. 25.

The controller 12 of the server apparatus 4 performs processing of notifying a determination result in Step S221, and then determines, in Step S222, whether an authentication processing request has been received from the user terminal 2.

When the approval request has not been received, the controller 12 of the server apparatus 4 determines, in Step S223, whether a certain period of time has elapsed since the processing of notifying a determination result was performed. When the certain period of time has elapsed, the controller 12 of the server apparatus 4 terminates the series of processes illustrated in FIG. 25.

On the other hand, When the certain period of time has not elapsed, the controller 12 of the server apparatus 4 returns to the process of Step S222.

It is highly probable that there will be a change in a person who operates the user terminal 2 after a long period of time elapses since the notification of a result of falsification determination processing. Thus, in this example, when a certain period of time elapsed from the notification of a determination result to the reception of an authentication processing request, the series of processes illustrated in FIG. 25 is terminated to not perform authentication processing of Step S225 described later. This prevents a subject appearing in captured-image data received in Step S201 from being different from a person who has actually made an authenticating processing request. In other words, such a configuration makes it possible to reduce the possibility that an unauthorized login will be performed.

When it has been determined, in Step S222, that an authentication processing request has been received, the controller 12 of the server apparatus 4 performs check processing in Step S224. The check processing is processing including acquiring, for example, an account name (a user ID) and a password that are included in the authentication processing request received from the user terminal 2 and checking the acquired account name and password against information stored in a database. When it has been determined that the information received from the user terminal 2 matches the information stored in the database, the checking is determined to be successful. Further, when it has been determined that the information received from the user terminal 2 does not match the information stored in the database, the checking is determined to not be successful.

In Step S225, the controller 12 of the server apparatus 4 performs authentication processing. The authentication processing is processing of determining whether a user is to be allowed to use a specific function, on the basis of a result of the falsification determination processing and a result of the check processing. In other words, when authentication has been determined to be successful, the user is allowed to use the specific function. On the other hand, when authentication has been determined to not be successful, the user is not allowed to use the specific function.

In Step S226, the controller 12 of the server apparatus 4 performs processing of notifying a result of the authentication processing. This results in displaying, on the screen of the user terminal 2, information that indicates whether authentication (login) has been successful. For example, when authentication is successful, the My Page is displayed, and when authentication is not successful, a page used to notify that authentication is not successful.

Note that there are various combinations of a result of falsification determination processing and an authentication result. For example, from among the various combinations, the case (a first case) in which a "determination that no falsification has been performed" has been obtained as a falsification determination result, and a determination that authentication is successful has been obtained as an authentication processing result, and the case (a second case) in which a determination that falsification has been performed has been obtained as a falsification determination result, and a determination that authentication is successful has been obtained as an authentication processing result are likely to be cases for which authentication has been determined to be successful.

With respect to the first case, various functions provided by the server apparatus 4 can be used with no problem.

With respect to the second case, there are various examples since the determination that falsification has been performed has been obtained as the falsification determination result. For example, the functions provided by the server apparatus 4 may be provided in a state in which a portion of the various functions are limited.

Further, with respect to the second case, all of the functions may be used only under specific conditions. Specifically, a MAC address of the user terminal 2 used by a user is acquired, and processing of determining whether there is a history of past use of the user terminal 2, is further performed. When it has been determined that the user terminal 2 is an already used terminal, authentication is determined to be successful.

Alternatively, a secondary authentication may be performed using the user terminal 2 or another terminal. Specifically, processing including transmitting an authentication code to a registered e-mail address, and causing the authentication code to be input, may be performed, or processing of causing an answer to a secret question to be input, may be performed. When a user can perform a proper input operation for these processes, authentication may be determined to be successful, and the user may be allowed to use all of the functions.

When the server apparatus 4 performs not only the falsification determination processing but also a result of the living-body determination processing or the individual determination processing, it is sufficient if it is determined that all of the functions are to be provided, or a portion of the functions are to be provided, or secondary authentication processing is to be performed, on the basis of the combination of results of the determination processes.

Such a configuration makes it possible to prevent, for example, an unauthorized use or an improper use of the functions provided by the server apparatus 4.

The information processing system 1 according to the fourth embodiment can also be applied to a sign-up system that includes, for example, a tablet terminal with which a genuine signature can be input. Specifically, the information processing system 1 includes an operation terminal placed for a visitor coming to an office and the server apparatus 4 used to perform authentication.

Figure 26:
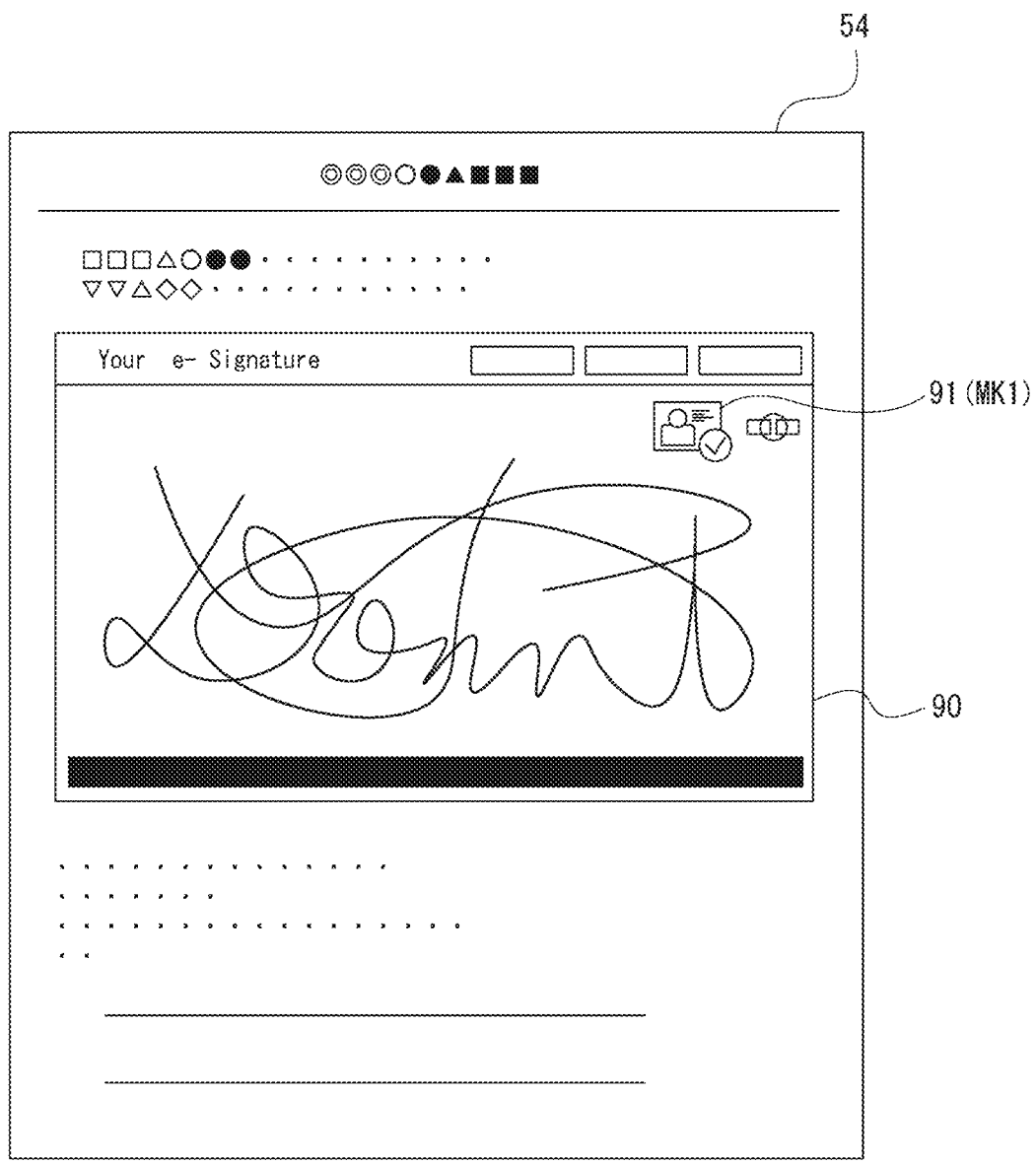
FIG. 26 illustrates an example of a sign-up screen in the information processing system according to the fourth embodiment.

FIG. 26 illustrates an example of a specific sign-up screen 54 that is displayed on a tablet terminal. The sign-up screen 54 displays thereon a signature input field 90 to which a signature is input, and an assurance icon 91 that is displayed in the signature input field 90. The assurance icon 91 is displayed according to a content of processing performed by the server apparatus 4. When the server apparatus 4 only performs falsification determination processing, one of the non-assurance icon MK0 and the first assurance icon MK1 is displayed.

Further, when the server apparatus 4 performs not only the falsification determination processing but also living-body determination processing or individual determination processing, one of the non-assurance icon MK0, the first assurance icon MK1, the second assurance icon MK2, and the third assurance icon MK3 is displayed.

In this case, it is sufficient if the operation terminal placed for a visitor performs the processes being performed by the user terminal 2 and described with reference to the respective figures. In other words, it is sufficient if the user terminal 2 described above is replaced with the operation terminal. Thus, the operation terminal corresponds to the information processing apparatus including the array sensor 10 illustrated in FIG. 21. Further, the server apparatus 4 performs various determination processes related to data of an image of a visitor captured using the array sensor 10 and a genuine signature input by the visitor.

5. MODIFICATIONS

The example in which only an information processing apparatus on the reception side performs the falsification determination processing, the living-body determination processing, and the individual determination processing has been described in the respective embodiments described above.

In this modification, those processes are also performed by an information processing apparatus on the transmission side. Specifically, the information processing apparatus on the transmission side performs the living-body determination processing. An example of processing performed by the user terminal 2 corresponding to the information processing apparatus on the transmission side in this case is described with reference to FIG. 27.

Note that the information processing system 1 serving as a video chat system is described as an example in this modification.

A process similar to the process illustrated in FIG. 9 is denoted by a reference numeral similar to a reference numeral of the process of FIG. 9, and a description thereof is omitted as appropriate.

The user terminal 2 performs an image-capturing operation in Step S101, generates a hash value in Step S102, and encrypts the hash value in Step S103. Note that, in this example, pieces of data of a plurality of captured images are acquired.

Next, in Step S131, the user terminal 2 performs processing including analyzing the pieces of data of the plurality of captured images and extracting biological information. This processing is processing similar to the process of Step S211 (FIG. 18) being performed by the user terminal 2B on the reception side in the third embodiment.

Subsequently, in Step S132, the user terminal 2 determines whether a subject is a living body on the basis of the extracted biological information. This processing is processing similar to the process of Step S212 of FIG. 18.

In Step S133, the user terminal 2 performs branch processing on the basis of a result of the determination of whether the subject is a living body.

When the subject has been determined to be a living body, the user terminal 2 transmits a call start request to the server apparatus 4 in Step S104.

Figure 27:
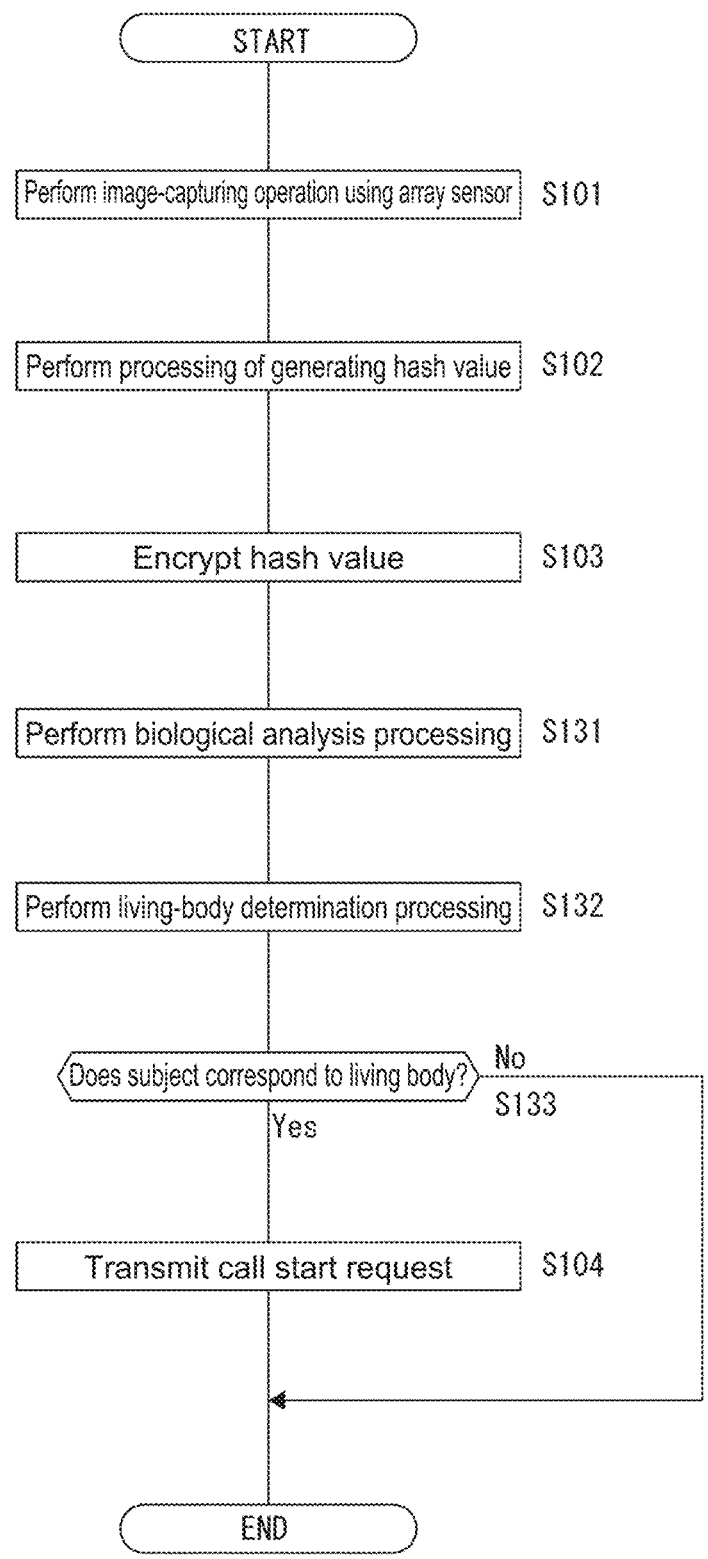
FIG. 27 is a flowchart illustrating processing performed by the user terminal in an information processing system according to a modification.

On the other hand, when it has not been determined that the subject is a living body (or when it has been determined that the subject is not a living body), the user terminal 2 terminates the series of processes illustrated in FIG. 27. In other words, no call start request is made to the server apparatus 4.

Consequently, the server apparatus 4 receives a call start request only when the user terminal 2 has guaranteed that a subject is a living body. Thus, when the server apparatus 4 has not determined that a subject is a living body, a fraudulent call start request has likely been made by an unauthorized person. In this case, a call is not started even if a call start request is received, and this makes it possible to prevent a fraudulent act such as fraud.

Note that the user terminal 2 may perform individual analysis processing and individual determination processing, and may transmit a call start request of Step S104 only when information with which an individual can be specified is extracted.

This makes it possible to further prevent a fraudulent call start request from being made.

The example in which a notification is provided to a user using the assurance icon 62 has been described above. However, other methods may be adopted. For example, a notification may be provided using sound. Further, a notification using the assurance icon 62 and a notification using sound may be performed at the same time or by time division.

For example, in the case of the information processing system 1 serving as a video chat system, a ringtone may be changed according to an assurance state.

Further, a mode and a design of a screen may be changed, such as changing a background color of the incoming call screen 50 according to an assurance state.

Note that at least one of the user terminals 2 described above may be a shop terminal. For example, in order to assure that a user (a customer or an operator at a shop) is actually operating a shop terminal in front of the terminal, an image-capturing operation, a hash-value generation, and a hash-value encryption may be performed using the shop terminal, and decryption processing, processing of calculating a hash value, processing of comparing hash values, and falsification determination processing may be performed using the server apparatus to detect that hacking has not been performed. Further, in this case, the server apparatus may further perform biological analysis processing and living-body determination processing to assure that a fraudulent act has not been automatically performed using a machine. Further, the server apparatus may perform individual analysis processing and individual determination processing, and may compare an acquired individual feature value of an operator with pre-stored data regarding the operator to assure that the operation is certainly being performed by the registered operator. This makes it difficult to perform a fraudulent act, and thus makes it possible to improve the security.

6. CONCLUSION

As described in the respective embodiments and the modifications above, the information processing system 1 includes the array sensor 10 including the pixel array 21 including a plurality of one-dimensionally or two-dimensionally arranged pixels each including a light-receiving element that receives visible light or non-visible light, the hash value generator 22 generating a hash value from captured-image data obtained on the basis of a photoelectric conversion performed by the pixel array, and the encryption processing section 23 performing processing of encrypting the hash value; the acquisition section 31 acquiring the captured-image data and the encrypted hash value; the decryption processing section 32 decrypting the acquired encrypted hash value; the hash value calculator 33 calculating a hash value from the acquired captured-image data; the hash value comparing section 34 comparing the hash value obtained by the decryption with the calculated hash value; and the falsification determination section 35 determining whether the acquired captured-image data has been falsified, on the basis of a result of the comparison of the hash values.

In other words, generation of a hash value and encryption processing are performed in the array sensor 10.

This results in being able to considerably reduce the possibility that data of a captured image will be falsified from the image being captured to the image being used to generate a hash value, and thus to increase the degree of difficulty in falsification. Further, this also results in being able to improve the performance in detecting falsification.

As described in the first and third embodiments, the biological analysis processing section 36 performing analysis for extracting biological information regarding a subject on the basis of acquired captured-image data, and the living-body determination section 37 determining whether the subject is a living body on the basis of a result of the analysis performed by the biological analysis processing section 36, may be included.

This makes it possible to determine whether the subject is a living body.

Accordingly, for example, it is possible to determine whether a call start request or an authentication processing request was transmitted when a living human was in front of a terminal, and thus to distinguish between an authorized login operation performed by a user and unauthorized login processing performed by a machine. This results in being able to prevent, for example, fraud.

In other words, for example, even when a model of a face of a certain person is produced by a 3D printer and is placed in front of a camera, a procedure performed by another person will hardly be falsely recognized as being performed by the certain person himself/herself.

Further, for example, the case in which a chat function for inquiries that is provided to a website is used on the website is discussed. When an operator actually responds, an assurance mark used to assure that a human is responding is displayed on a user terminal used by an inquiring user. This makes it possible to emphasize that a response is not mechanically made and thus to increase a degree of confidence of the user. In this case, a user terminal used by the operator is the user terminal 2A according to the third embodiment, the user terminal 2A performing processing of generating a hash value and processing of encrypting a hash value, and the user terminal used by the inquiring user is the user terminal 2B according to the third embodiment, the user terminal 2B performing decryption processing, processing of calculating a hash value, processing of comparing hash values, falsification determination processing, biological analysis processing, and living-body determination processing.

As described in the first and third embodiments, the individual analysis processing section 38 analyzing an individual feature value of a subject that is included in the acquired captured-image data, and the individual determination section 39 determining whether the subject can be individually recognized, on the basis of a result of the analysis performed by the individual analysis processing section 38, may be included.

This makes it possible to obtain information used to individually specify a subject.

This makes it possible to, for example, provide a function to a specific user and notify a communication partner that the user is a specific user. This results in being able to prevent, for example, falsification and spoofing, and thus to prevent, for example, fraud.

Further, for example, a user who is involved in business activities makes a call request to another user using an image-capturing apparatus that includes the array sensor 10 being capable of performing the processing of generating a hash value and the encryption processing according to the present technology. This makes it possible to relax the wariness of the other user and to make the user more reliable. This makes it easier to conduct business activities.

As described in, for example, the first embodiment, the output controller 40 performing an output control for notifying a result of the determination performed by the falsification determination section 35 may be included.

This enables the user to recognize the falsification determination result.

Thus, the user can select an operation according to the determination result. For example, in the case of a video chat system, it is possible to perform selection with respect to whether to respond to an incoming call from the other party, on the basis of the falsification determination result.

As described in, for example, the third embodiment, the output controller 40 performing an output control for notifying a result of the determination performed by the living-body determination section 37 may be included.

This makes it possible to notify a user of a result of the living-body determination.

Thus, the user can select an operation according to the result of the living-body determination. For example, it is possible to identify a call request automatically made by a machine and to reject such a call request.

As described in the third embodiment, the output controller 40 performing an output control for notifying a result of the determination performed by the individual determination section 39 may be included.

This makes it possible to notify a user of a result of the individual determination.

Thus, the user can select an operation according to the result of the individual determination. For example, it is possible to reject a call request from a suspicious user who has not been individually authenticated.

As described in the respective embodiments, an image-capturing apparatus (the user terminal 2A) and an information processing apparatus (the user terminal 2B) may be included, the image-capturing apparatus may include the array sensor 10, and the information processing apparatus may include the acquisition section 31, the decryption processing section 32, the hash value calculator 33, the hash value comparing section 34, the falsification determination section 35, and the output controller 40.

For example, such a configuration can be applied to a surveillance camera system that includes the image-capturing apparatus and the information processing apparatus.

Specifically, it is possible to confirm, using a server apparatus serving as the information processing apparatus, that data of a captured image captured by a surveillance camera is certainly data of an image captured by the surveillance camera and the captured-image data has not been falsified.

Further, when two people have a call, the user terminal 2 (2A) used by one of the users may be regarded as the image-capturing apparatus, and the user terminal 2 (2B) used by another of the users may be regarded as the information processing apparatus.

As described in the respective embodiments, the output controller 40 may perform control such that the acquired captured-image data is output to be displayed, and may perform control such that the result of the determination performed by the falsification determination section 35 with respect to the acquired captured-image data is output to be displayed.

For example, it is conceivable that such an information processing system could be applied to an information processing system that performs a user interface control such that a received captured image is displayed and such that display to indicate whether the image has been falsified is performed.

For example, it is conceivable that such an information processing system could be applied to a video chat system or a system that manages a surveillance camera. Further, with respect to an auction system, it is also conceivable that, when an image of a product put up for sale using an application (an auction application) used by a user is displayed, captured-image data (data of the image of the product) uploaded to a server apparatus and an encrypted hash value could be acquired, processing of determining whether falsification has been performed could be performed, and a result of the determination could be displayed with the image. This enables the user to confirm that the image is not a falsified image in which, for example, a scratch made on a product has been deleted using, for example, an image processing application. This makes it possible to improve the convenience. Further, this makes it possible to identify fraud such as improperly giving the product a high-quality appearance.

Figure 28:
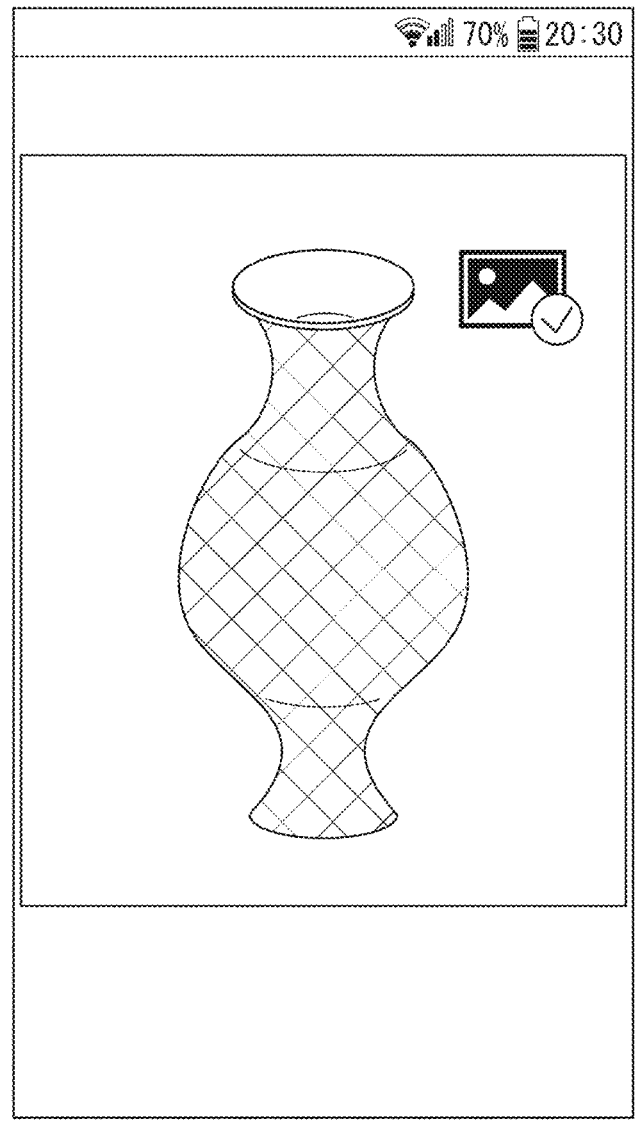
FIG. 28 illustrates a state in which an image that has not been falsified is displayed on an auction site.
Figure 29:
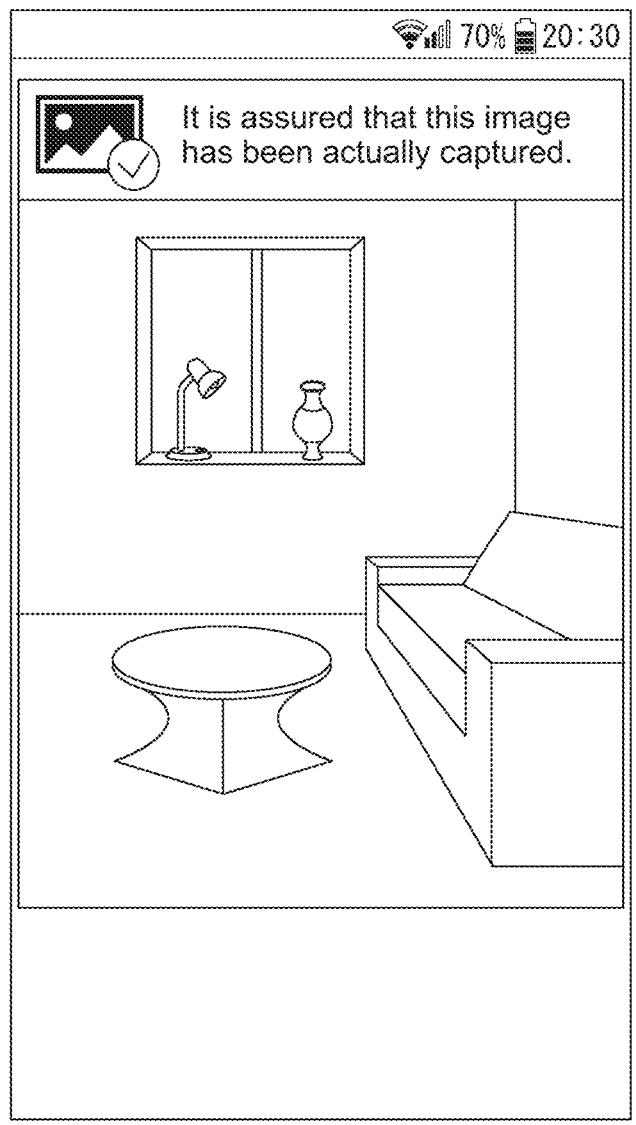
FIG. 29 illustrates a state in which an image that has not been falsified is displayed on an accommodation search site.

Specifically, an image of a product put up for sale (refer to FIG. 28) is posted on an auction site of an auction system, and an image of a room (refer to FIG. 29) is posted on a search site of an accommodation search system. Further, an actually-captured-image assurance icon that indicates that falsification has not been performed is superimposed on an upper portion of each of the captured images. When such an actually-captured-image assurance icon is superimposed, this enables a user to confirm that the image is not a falsified image in which the appearance of a subject (the product put up for sale or the room) has been improved using, for example, an image processing application.

Such a subject is not a subject for which the biological information described above is not extracted, but is, for example, a subject of an inorganic substance for which biological information is not extracted. In other words, the present technology can be applied not only to a subject such as a person for which biological information can be extracted, but also to a subject such as a subject of an inorganic substance.

As described in the application example of the third embodiment, the output controller 40 may perform control such that the result of the determination performed by the falsification determination section 35 is output to be displayed without the acquired captured-image data being output to be displayed.

For example, it is conceivable that such an information processing system could be applied to a text chat system in which a captured image is not displayed.

Criteria for determining, for example, whether a communication partner is reliable can be presented even when an image is not displayed. Thus, it is possible to prevent, for example, fraud.

As described in the application example of the third embodiment, the output controller 40 may perform control such that a chat screen is presented, and may perform control such that the result of the determination performed by the falsification determination section 35 is output to be displayed on the chat screen for each participant in a chat, the determination being performed by the falsification determination section 35 with respect to data of a captured image of the participant, the data of the captured image being received from an image-capturing apparatus (the user terminal 2A) used by the participant in the chat.

In, for example, a text chat system in which a captured image is not displayed, it is difficult to know what kind of people are participating in the chat. According to this configuration, criteria for determining whether a participant is reliable are displayed for each participant.

This enables a user to perform an appropriate communication.

As described in the fourth embodiment, an image-capturing apparatus (the user terminal 2) and an information processing apparatus (the server apparatus 4) may be included, the image-capturing apparatus may include the array sensor 10 and the output controller 40, and the information processing apparatus may include the authentication processing section 42 performing authentication processing, the acquisition section 31, the decryption processing section 32, the hash value calculator 33, the hash value comparing section 34, and the falsification determination section 35.

For example, it is conceivable that such an information processing system could be applied to an information processing system in which an information processing apparatus (an image-capturing apparatus) that transmits captured-image data notifies, for example, an authentication result.

Specifically, there is an authentication system that includes, for example, a server apparatus that performs authentication processing with an authentication-target terminal (such as a smartphone) that serves as the image-capturing apparatus.

This makes it possible to identify a fraudulent authentication request in the server apparatus, and this prevents authentication from being performed in response to the fraudulent authentication request.

As described in the fourth embodiment, the output controller 40 may perform control such that the result of the determination performed by the falsification determination section 35 is output to be displayed, the result of the determination being acquired from an information processing apparatus (the server apparatus 4), and the authentication processing section 42 may perform authentication processing on the basis of the result of the determination performed by the falsification determination section 35.

In other words, using an apparatus (an image-capturing apparatus: the user terminal 2) that transmits captured-image data, a user can recognize whether the transmitted captured-image data has reached the server apparatus 4 (the information processing apparatus) without being falsified, the server apparatus 4 being an apparatus on the reception side.

This enables the user to recognize whether hacking is being performed.

Further, it is possible to more easily identify a fraudulent authentication request (such as a fraudulent login request) in the server apparatus 4, and thus to perform authentication more strictly.

As described in the fourth embodiment, the information processing apparatus (the server apparatus 4) may include the biological analysis processing section 36 performing analysis for extracting biological information regarding a subject on the basis of the acquired captured-image data, and the living-body determination section 37 determining whether the subject is a living body on the basis of a result of the analysis performed by the biological analysis processing section 36; the output controller 40 may perform control such that a result of the determination performed by the living-body determination section 37 is output to be displayed; and the authentication processing section 42 may perform authentication processing on the basis of the result of the determination performed by the living-body determination section 37.

In other words, not only falsification determination processing, but also processing that includes extracting biological information from received captured-image data, and determining, on the basis of a result of the extraction, whether a subject is a living body, is performed.

This makes it possible to perform authentication more strictly, and thus to enhance the security.

As described in the first and third embodiments, the individual analysis processing section 38 analyzing an individual feature value of a subject that is included in acquired captured-image data; the individual determination section 39 determining whether the subject can be individually recognized on the basis of a result of the analysis performed by the individual analysis processing section 38; and the state determination section 41 determining the non-guarantee state ST0, the first guarantee state ST1, the second guarantee state ST2, and the third guarantee state ST3 on the basis of a result of the determination of whether falsification has been performed, a result of the determination of whether the subject is a living body, and a result of the determination of whether the subject can be individually recognized, may be included, where the non-guarantee state ST0 is a state in which there is no guarantee that the acquired captured-image data has not been falsified, the first guarantee state ST1 is a state in which the acquired captured-image data is guaranteed to not have been falsified, the second guarantee state ST2 is a state in which the acquired captured-image data is guaranteed to not have been falsified, and the subject has been determined to be a living body, and the third guarantee state ST3 is a state in which the acquired captured-image data is guaranteed to not have been falsified, the subject has been determined to be a living body, and the subject has been determined to be individually recognized.

This makes it possible to perform processing according to a degree of assurance of security.

For example, an image output depending on the degree of assurance may be performed, or the system may be used with the functionality of the system being restricted according to the degree of assurance. For example, in the server apparatus performing authentication processing, processing of allowing all of the functions of the system to be used may be performed in the third guarantee state ST3, and processing of allowing the system to be used with a portion of the functions being restricted may be performed in the second guarantee state ST2.

As described in the first and third embodiments, the output controller 40 performing output and display according to the non-guarantee state ST0, the first guarantee state ST1, the second guarantee state ST2, or the third guarantee state ST3, may be included.

This enables the user to confirm the degree of assurance.

For example, in a system, such as a chat system or a call system, in which users communicate with each other, the user can select an operation according to the degree of assurance.

Further, when output and display is performed by the server apparatus 4, this enables, for example, an administrator to perform processing according to the output and display.

As described in the third embodiment, the living-body determination section 37 may determine whether the subject is a living body by determining whether there is a change in a biological signal of the subject that is obtained as a result of the analysis.

For example, the change in the biological signal is extracted by analyzing pieces of data of a plurality of captured images.

Examples of the biological signals include the presence or absence of nystagmus, lip-sync, a pupillary reaction, and a detection of heartbeat by spectrum analysis. Such a quantitative analysis makes it possible to determine, for example, whether an operation has been performed by a human. This results in being able to prevent, for example, fraud, and an unauthorized access by a machine.

The program of the embodiments is a program that causes, for example, a CPU, a DSP, or a device that includes the CPU or the DSP to perform the processing illustrated in each of FIGS. 9, 10, 14 to 18, and 24 to 27.

In other words, the program of the embodiments causes the controller 12 to acquire captured-image data obtained by a photoelectric conversion being performed and an encrypted hash value from an array sensor that includes a pixel array that includes a plurality of one-dimensionally or two-dimensionally arranged pixels each including a light-receiving element that receives visible light or non-visible light, a hash value generator that generates a hash value from the captured-image data, and an encryption processing section that performs processing of encrypting the hash value.

Further, the program causes the controller 12 to decrypt the acquired encrypted hash value.

Furthermore, the program causes the controller 12 to calculate a hash value from the acquired captured-image data.

Moreover, the program causes the controller 12 to compare the hash value obtained by the decryption with the calculated hash value.

In addition, the program causes the controller 12 to determine whether the acquired captured-image data has been falsified, on the basis of a result of the comparison of the hash values.

The information processing system 1 described above can be implemented by such a program.

Such a program implementing the information processing system 1 can be recorded in advance in, for example, a built-in HDD that is included, as a recording medium, in equipment such as a computer apparatus, or a ROM in a microcomputer that includes a CPU.

Alternatively, the program can be temporarily or permanently stored (recorded) in a removable recording medium such as a flexible disk, a compact disc read-only memory (CD-ROM), a magneto optical (MO) disk, a digital versatile disc (DVD), the Blu-ray Disc (registered trademark), a magnetic disk, a semiconductor memory, or a memory card. Such a removable recording medium can be provided as so-called package software.

Further, such a program can be installed on, for example, a personal computer from a removable recording medium, or can be downloaded from a download site through a network such as a local area network (LAN) or the Internet.

Further, such a program makes the information processing system 1 (or the user terminal 2 of the information processing system 1) of the embodiments suitable to be extensively provided. When the program is downloaded into equipment with a camera function, such as a mobile terminal apparatus such as a smartphone or a tablet; a cellular phone; a personal computer; a gaming machine; a video apparatus; or a personal digital assistant (PDA), this enables, for example, the smartphone to serve as the information processing system 1 (or the user terminal 2) of the present disclosure.

Further, such a program makes it possible to perform a user interface control in equipment with a camera function, such as a mobile terminal apparatus such as a smartphone or a tablet; a cellular phone; a personal computer; a gaming machine; a video apparatus; or a personal digital assistant (PDA).

Note that the effects described herein are not limitative but are merely illustrative, and other effects may be provided.

7. PRESENT TECHNOLOGY (1) An information processing system, including:
   an array sensor that includes
      a pixel array that includes a plurality of one-dimensionally or two-dimensionally arranged pixels each including a light-receiving element that receives visible light or non-visible light,
      a hash value generator that generates a hash value from captured-image data obtained by a photoelectric conversion being performed, and
      an encryption processing section that performs processing of encrypting the hash value;
   an acquisition section that acquires the captured-image data and the encrypted hash value;
   a decryption processing section that decrypts the acquired encrypted hash value;
   a hash value calculator that calculates a hash value from the acquired captured-image data;
   a hash value comparing section that compares the hash value obtained by the decryption with the calculated hash value; and
   a falsification determination section that determines whether the acquired captured-image data has been falsified, on the basis of a result of the comparison of the hash values.

(2) The information processing system according to (1), further including:
   a biological analysis processing section that performs analysis for extracting biological information regarding a subject, on the basis of the acquired captured-image data; and
   a living-body determination section that determines whether the subject is a living body on the basis of a result of the analysis performed by the biological analysis processing section.

(3) The information processing system according to (1) or (2), further including:
   an individual analysis processing section that analyzes an individual feature value of the subject that is included in the acquired captured-image data; and
   an individual determination section that determines whether the subject is individually recognizable, on the basis of a result of the analysis performed by the individual analysis processing section.

(4) The information processing system according to any one of (1) to (3), further including
   an output controller that performs an output control for notifying a result of the determination performed by the falsification determination section.

(5) The information processing system according to (2), further including
   an output controller that performs an output control for notifying a result of the determination performed by the living-body determination section.

(6) The information processing system according to (3), further including
   an output controller that performs an output control for notifying a result of the determination performed by the individual determination section.

(7) The information processing system according to (4), further including:
   an image-capturing apparatus; and
   an information processing apparatus, the image-capturing apparatus including the array sensor, the information processing apparatus including the acquisition section, the decryption processing section, the hash value calculator, the hash value comparing section, the falsification determination section, and the output controller.

(8) The information processing system according to (7), in which
   the output controller
      performs control such that the acquired captured-image data is output to be displayed, and
      performs control such that the result of the determination performed by the falsification determination section with respect to the acquired captured-image data is output to be displayed.

(9) The information processing system according to (7), in which
   the output controller performs control such that the result of the determination performed by the falsification determination section with respect to the acquired captured-image data is output to be displayed.

(10) The information processing system according to (9), in which
   the output controller
      performs control such that a chat screen is presented, and
      performs control such that the result of the determination performed by the falsification determination section is output to be displayed on the chat screen for each participant in a chat, the determination being performed by the falsification determination section with respect to data of a captured image of the participant, the data of the captured image being received from the image-capturing apparatus used by the participant in the chat.

(11) The information processing system according to (4), further including:
   an image-capturing apparatus; and
   an information processing apparatus, the image-capturing apparatus including the array sensor and the output controller, the information processing apparatus including an authentication processing section that performs authentication processing, the acquisition section, the decryption processing section, the hash value calculator, the hash value comparing section, and the falsification determination section.

(12) The information processing system according to (11), in which
   the output controller performs control such that the result of the determination performed by the falsification determination section is output to be displayed, the result of the determination being acquired from the information processing apparatus, and the authentication processing section performs the authentication processing on the basis of the result of the determination performed by the falsification determination section.

(13) The information processing system according to (12), in which the information processing apparatus includes a biological analysis processing section that performs analysis for extracting biological information regarding a subject, on the basis of the acquired captured-image data, and a living-body determination section that determines whether the subject is a living body on the basis of a result of the analysis performed by the biological analysis processing section, the output controller performs control such that a result of the determination performed by the living-body determination section is output to be displayed, and the authentication processing section performs the authentication processing on the basis of the result of the determination performed by the living-body determination section.

(14) The information processing system according to (2), further including:

an individual analysis processing section that analyzes an individual feature value of the subject that is included in the acquired captured-image data;

an individual determination section that determines whether the subject is individually recognizable, on the basis of a result of the analysis performed by the individual analysis processing section; and a state determination section that determines a non-guarantee state, a first guarantee state, a second guarantee state, and a third guarantee state on the basis of a result of the determination of whether the falsification has been performed, a result of the determination of whether the subject is a living body, and a result of the determination of whether the subject is individually recognizable, the non-guarantee state being a state in which there is no guarantee that the acquired captured-image data has not been falsified, the first guarantee state being a state in which the acquired captured-image data is guaranteed to not have been falsified, the second guarantee state being a state in which the acquired captured-image data is guaranteed to not have been falsified, and the subject has been determined to be a living body, the third guarantee state being a state in which the acquired captured-image data is guaranteed to not have been falsified, the subject has been determined to be a living body, and the subject has been determined to be individually recognizable.

(15) The information processing system according to (14), further including an output controller that performs output and display according to the non-guarantee state, the first guarantee state, the second guarantee state, or the third guarantee state.

(16) The information processing system according to (2), in which the living-body determination section determines whether the subject is a living body by determining whether there is a change in a biological signal that is obtained as a result of the analysis.

(17) The information processing system according to (1), in which a subject in the captured-image data is a subject for which biological information is not extractable.

(18) An information processing method, including:

acquiring, by an information processing apparatus, captured-image data obtained by a photoelectric conversion being performed and an encrypted hash value from an array sensor that includes a pixel array that includes a plurality of one-dimensionally or two-dimensionally arranged pixels each including a light-receiving element that receives visible light or non-visible light, a hash value generator that generates a hash value from the captured-image data, and an encryption processing section that performs processing of encrypting the hash value;

decrypting, by the information processing apparatus, the acquired encrypted hash value;

calculating, by the information processing apparatus, a hash value from the acquired captured-image data;

comparing, by the information processing apparatus, the hash value obtained by the decryption with the calculated hash value; and determining, by the information processing apparatus, whether the acquired captured-image data has been falsified, on the basis of a result of the comparison of the hash values.

(19) A program that causes an information processing apparatus to perform a process including:

acquiring captured-image data obtained by a photoelectric conversion being performed and an encrypted hash value from an array sensor that includes a pixel array that includes a plurality of one-dimensionally or two-dimensionally arranged pixels each including a light-receiving element that receives visible light or non-visible light, a hash value generator that generates a hash value from the captured-image data, and an encryption processing section that performs processing of encrypting the hash value;

decrypting the acquired encrypted hash value;

calculating a hash value from the acquired captured-image data;

comparing the hash value obtained by the decryption with the calculated hash value; and determining whether the acquired captured-image data has been falsified, on the basis of a result of the comparison of the hash values.

(20) A user interface that notifies a result of performing processing of determining whether captured-image data obtained by a photoelectric conversion being performed has been falsified, on the basis of a result of comparing a hash value obtained by decrypting an encrypted hash value with a hash value calculated from the captured-image data, the encrypted hash value and the captured-image data being acquired from an array sensor that includes a pixel array that includes a plurality of one-dimensionally or two-dimensionally arranged pixels each including a light-receiving element that receives visible light or non-visible light, a hash value generator that generates a hash value from the captured-image data, and an encryption processing section that performs processing of encrypting the hash value.

REFERENCE SIGNS LIST 1, 1A information processing system
2, 2A, 2B user terminal
4 server apparatus
10 array sensor
12 controller
21 pixel array
22 hash value generator
23 encryption processing section
24 image encryption processing section
31 acquisition section
32 decryption processing section
33 hash value calculator
34 hash value comparing section
35 falsification determination section
36 biological analysis processing section
37 living-body determination section
38 individual analysis processing section
39 individual determination section
40 output controller
41 state determination section
42 authentication processing section

The invention claimed is:

1. An information processing system, comprising:
an array sensor that comprises
   a pixel array that comprises a plurality of one-dimensionally or two-dimensionally arranged pixels, each pixel comprising a light-receiving element that receives visible light or non-visible light; and
   a first circuitry configured to
   generate a hash value from captured image data obtained on a basis of a photoelectric conversion performed by the pixel array; and
   generate a private key and a public key, and generate an encrypted hash value by preforming processing of encrypting the hash value using the private key; and
a controller that comprises
   a second circuitry configured to
   acquire the captured image data, the encrypted hash value and the public key;
   decrypt the acquired encrypted hash value using the public key;
   calculate a hash value from the acquired captured image data;
   compare the hash value obtained by the decryption with the calculated hash value; and
   determine whether the acquired captured image data has been falsified, on a basis of a result of the comparison of the hash values.

2. The information processing system according to claim 1, wherein the second circuitry is further configured to:
perform analysis to extract biological information regarding a subject, on a basis of the acquired captured image data; and
determine whether the subject is a living body on a basis of a result of the analysis performed.

3. The information processing system according to claim 1, wherein the second circuitry is further configured to:
analyze an individual feature value of a subject that is included in the acquired captured image data; and
determine whether the subject is individually recognizable, on a basis of a result of the analysis performed.

4. The information processing system according to claim 1, wherein the second circuitry is further configured to:
perform an output control to notify a result of the determination of whether the acquired captured image data has been falsified.

5. The information processing system according to claim 2, wherein the second circuitry is further configured to:
perform an output control to notify a result of the determination of whether the subject is a living body.

6. The information processing system according to claim 3, wherein the second circuitry is further configured to:
perform an output control to notify a result of the determination of whether the subject is individually recognizable.

7. The information processing system according to claim 4, further comprising:
an image capturing apparatus; and
an information processing apparatus, wherein the image capturing apparatus comprises the array sensor, and wherein the information processing apparatus comprises the acquisition section, the decryption processing section, the hash value calculator, the hash value comparing section, the falsification determination section, and the output controller.

8. The information processing system according to claim 7, wherein the second circuitry is configured to
perform control such that the acquired captured image data is output to be displayed, and
perform control such that the result of the determination of whether the acquired captured image data has been falsified with respect to the acquired captured image data is output to be displayed.

9. The information processing system according to claim 7, wherein the second circuitry is configured to
perform control such that a chat screen is presented, and
perform control such that the result of the determination of whether the acquired captured image data has been falsified is output to be displayed on the chat screen for each participant in a chat, the determination being performed with respect to data of a captured image of the participant, the data of the captured image being received from the image capturing apparatus used by the participant in the chat.

10. The information processing system according to claim 4, further comprising:
an image-capturing apparatus; and
an information processing apparatus,
wherein the image capturing apparatus comprises the array sensor and the first circuitry is configured to perform an output control to notify a result of the determination of whether the acquired captured image data has been falsified, and wherein the information processing apparatus comprises the second circuitry.

11. The information processing system according to claim 10, wherein the second circuitry is configured to
perform control such that the result of the determination of whether the acquired captured image data has been falsified is output to be displayed, the result of the determination being acquired from the information processing apparatus, and
perform the authentication processing on a basis of the result of the determination of whether the acquired captured image data has been falsified.

12. The information processing system according to claim 11, wherein
the first circuitry is configured to perform control such that a result of the determination of whether the subject is a living body is output to be displayed; and the second circuitry is configured to
   perform analysis to extract biological information regarding a subject, on a basis of the acquired captured image data, and
   determine whether the subject is a living body on a basis of a result of the analysis performed,
   perform authentication processing on a basis of the result of the determination of whether the subject is a living body.

13. The information processing system according to claim 2, wherein the second circuitry is further configured to:
   analyze an individual feature value of the subject that is included in the acquired captured image data;
   determine whether the subject is individually recognizable, on a basis of a result of the analysis performed; and
   determine a non-guarantee state, a first guarantee state, a second guarantee state, and a third guarantee state on a basis of a result of the determination of whether falsification has been performed, a result of the determination of whether the subject is a living body, and a result of the determination of whether the subject is individually recognizable,
      the non-guarantee state being a state in which there is no guarantee that the acquired captured image data has not been falsified,
      the first guarantee state being a state in which the acquired captured image data is guaranteed to not have been falsified,
      the second guarantee state being a state in which the acquired captured image data is guaranteed to not have been falsified, and the subject has been determined to be a living body,
      the third guarantee state being a state in which the acquired captured image data is guaranteed to not have been falsified, the subject has been determined to be a living body, and the subject has been determined to be individually recognizable.

14. The information processing system according to claim 13, wherein the second circuitry is further configured to perform output and display according to the non-guarantee state, the first guarantee state, the second guarantee state, or the third guarantee state.

15. The information processing system according to claim 2, wherein the second circuitry is further configured to determine whether the subject is a living body by determining whether there is a change in a biological signal of the subject that is obtained as a result of the analysis.

16. The information processing system according to claim 1, wherein a subject in the captured image data is a subject for which biological information is not extractable.

17. An information processing method, comprising:
   acquiring, by an information processing apparatus, from an array sensor that comprises a pixel array that comprises a plurality of one-dimensionally or two-dimensionally arranged pixels, each pixel comprising a light-receiving element that receives visible light or nonvisible light,
      captured image data obtained by a photoelectric conversion being performed and an encrypted hash value,
      an encrypted hash value that is generated by encrypting a hash value generated from the captured image data using a private key, and
      a public key;
   decrypting, by the information processing apparatus, the acquired encrypted hash value using the public key;
   calculating, by the information processing apparatus, a hash value from the acquired captured image data;
   comparing, by the information processing apparatus, the hash value obtained by the decryption with the calculated hash value; and
   determining, by the information processing apparatus, whether the acquired captured image data has been falsified, on a basis of a result of the comparison of the hash values.

18. A program that causes an information processing apparatus to perform a process comprising:
   acquiring, by an information processing apparatus, from an array sensor that comprises a pixel array that comprises a plurality of one-dimensionally or two-dimensionally arranged pixels, each pixel comprising a light-receiving element that receives visible light or nonvisible light,
      captured image data obtained by a photoelectric conversion being performed and an encrypted hash value,
      an encrypted hash value that is generated by encrypting a hash value generated from the captured image data using a private key, and
      a public key;
   decrypting, by the information processing apparatus, the acquired encrypted hash value using the public key;
   calculating, by the information processing apparatus, a hash value from the acquired captured image data;
   comparing, by the information processing apparatus, the hash value obtained by the decryption with the calculated hash value; and
   determining, by the information processing apparatus, whether the acquired captured image data has been falsified, on a basis of a result of the comparison of the hash values.

19. The information processing system according to claim 1, wherein the first circuitry is configured to set a coefficient depending on an encryption key so that a signal read from each pixel in the array sensor is encrypted.

20. The information processing system according to claim 1, wherein the second circuitry is configured to notify, on a user interface, a result of performing processing of determining whether captured image data obtained by a photoelectric conversion being performed has been falsified.

* * * * *